(12) United States Patent
Lazier et al.

(10) Patent No.: US 10,459,647 B1
(45) Date of Patent: Oct. 29, 2019

(54) MULTIPLE STORAGE CLASS REPRESENTATION IN VERSIONED STORAGE

(71) Applicant: Amazon Technologies, Inc., Seattle, WA (US)

(72) Inventors: Colin Laird Lazier, Seattle, WA (US); Leon Thrane, Issaquah, WA (US); William J. Vass, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/448,373

(22) Filed: Mar. 2, 2017

(51) Int. Cl.
*G06F 11/00* (2006.01)
*G06F 3/06* (2006.01)
*G06F 11/10* (2006.01)

(52) U.S. Cl.
CPC ............ *G06F 3/064* (2013.01); *G06F 3/0604* (2013.01); *G06F 3/065* (2013.01); *G06F 3/0647* (2013.01); *G06F 3/0652* (2013.01); *G06F 3/0683* (2013.01); *G06F 11/1004* (2013.01)

(58) Field of Classification Search
None
See application file for complete search history.

(56) References Cited

U.S. PATENT DOCUMENTS

| | | | |
|---|---|---|---|
| 7,743,023 B2 * | 6/2010 | Teodosiu | G06F 17/30212 707/612 |
| 8,261,033 B1 | 9/2012 | Slik et al. | |
| 8,650,156 B1 | 2/2014 | McHugh et al. | |
| 8,977,825 B1 | 3/2015 | Lewine et al. | |
| 9,418,067 B1 * | 8/2016 | Vice | G06F 17/30017 |
| 9,448,614 B2 | 9/2016 | Slik | |
| 2005/0262097 A1 * | 11/2005 | Sim-Tang | G06F 17/30085 |
| 2006/0010150 A1 | 1/2006 | Shaath et al. | |
| 2007/0180313 A1 * | 8/2007 | Stokes | G06F 17/30067 714/13 |
| 2008/0256138 A1 * | 10/2008 | Sim-Tang | G06F 11/1435 |
| 2013/0173548 A1 | 7/2013 | Haustein et al. | |
| 2014/0164694 A1 * | 6/2014 | Storer | G06F 11/1092 711/114 |
| 2015/0370793 A1 | 12/2015 | Chen et al. | |
| 2015/0370809 A1 | 12/2015 | Humby et al. | |
| 2016/0070771 A1 * | 3/2016 | Vermeulen | G06F 17/30575 707/687 |
| 2017/0032006 A1 | 2/2017 | Anglin et al. | |
| 2017/0371890 A1 | 12/2017 | Seker et al. | |

OTHER PUBLICATIONS

"Simple Storage Service Implementation Guide," NetApp, Sep. 2016, https://library.netapp.com/ecm/ecm_download_file/ECMLP2412007, 48 pages.

* cited by examiner

*Primary Examiner* — Daniel F. McMahon
(74) *Attorney, Agent, or Firm* — Davis Wright Tremaine LLP

(57) ABSTRACT

A version of a data object is updated as a result of a version changing operation and version metadata associated with the data object is updated based on a version key that is associated with the data object where the version metadata maintains a history of the version changing operations performed on the data object.

20 Claims, 21 Drawing Sheets

MULTIPLE STORAGE CLASS REPRESENTATION IN VERSIONED STORAGE

CROSS-REFERENCE TO RELATED APPLICATION

This application incorporates by reference for all purposes the full disclosure of co-pending U.S. patent application Ser. No. 15/448,384, filed concurrently herewith Mar. 2, 2017, entitled "POLICY-DRIVEN MULTIPLE STORAGE CLASS REPRESENTATION IN VERSIONED STORAGE."

BACKGROUND

Modern computer systems make extensive use of network computing and network data storage systems. Such use has proliferated in recent years, particularly in distributed or virtualized computer systems where multiple computer systems may share resources when performing operations and tasks associated with the computer systems. Such computer systems frequently utilize distributed data storage in multiple locations and of multiple data storage classes to store shared data items so that such data items may be made available to a plurality of consumers. The resources for network computing and network data storage are often provided by computing resource service providers who leverage large-scale networks of computers, servers, and storage drives to enable customers to store data for a variety of applications and services. The usage of such network computing and network data storage allows customers to efficiently and adaptively satisfy their varying computing needs, whereby the computing and data storage resources that may be required by the customers are added or removed from a large pool provided by a computing resource provider as needed.

The proliferation of network computing and network data storage of different data storage classes, as well as the attendant increase in the number of entities dependent on network computing and network data storage, have increased the amount and type of data to be stored. Because consumers have a variety of usages for stored data, different data objects are stored for varying amounts of time and in different data storage classes. Determining the current (or most recent) version of the data objects and the provenance of the data objects can be challenging and resource intensive.

BRIEF DESCRIPTION OF THE DRAWINGS

Various techniques will be described with reference to the drawings, in which.

DETAILED DESCRIPTION

Figure 1:
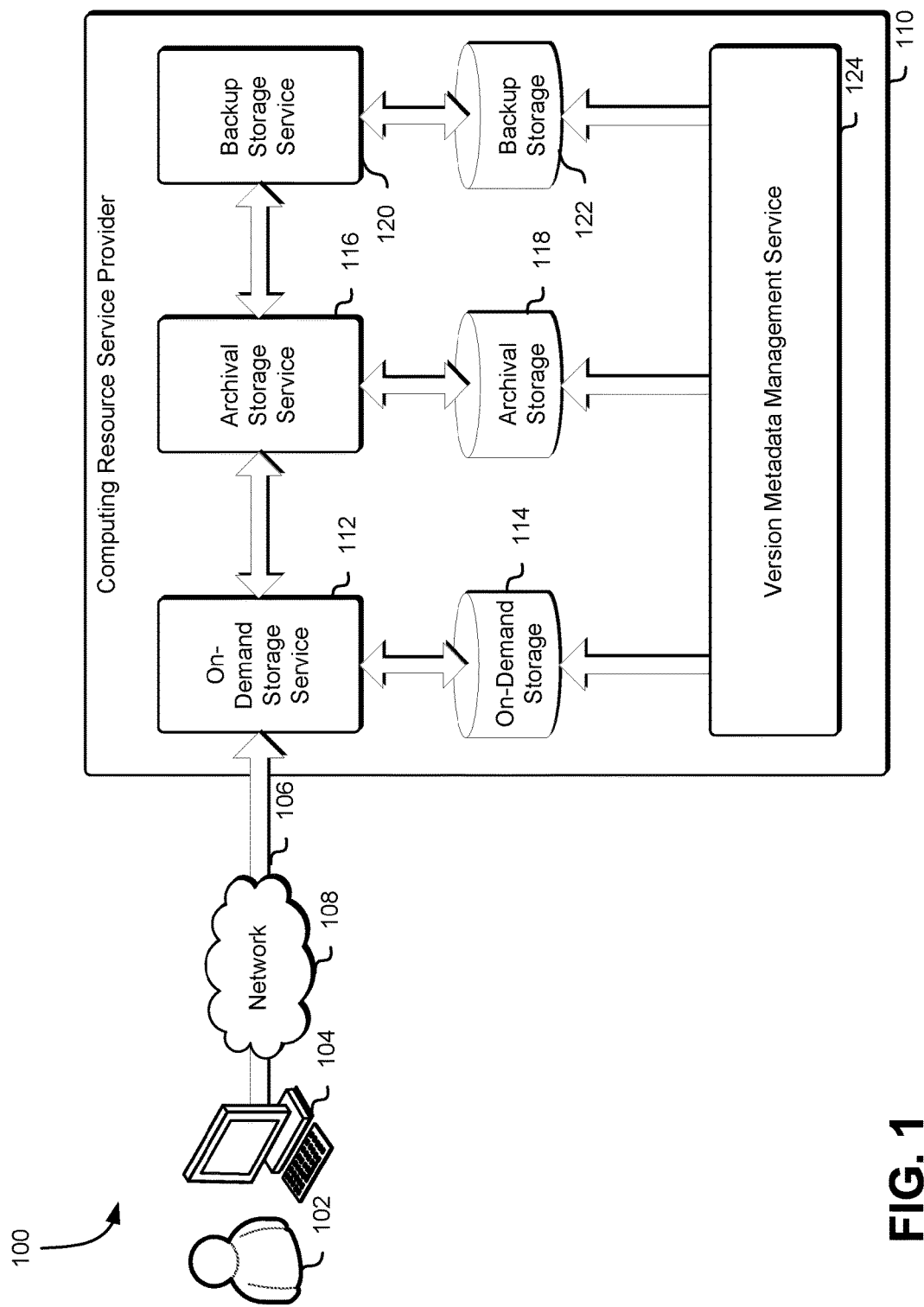
FIG. 1 illustrates an example environment where versioning of a data object stored in multiple data storage classes is managed by a version metadata management service.

Storage of data objects using data storage services can take a variety of forms and can use a variety of data storage classes. For example, a data object can be stored in a database, in volatile or non-volatile memory, on a hard drive or other fast access storage medium, in archive storage using, for example, tapes and tape drives, or in backup storage. Such data storage can be managed using key-value associations that associate the key with the data object so that reads, writes, updates, and deletes of the data object are managed using the key.

Data storage systems may include versioned data objects. A versioned data object is a data object where past versions of the data object are retained so that when the data object is updated or altered, the previous version of the data object is not deleted but is retained in a version chain of the object. In such data storage systems, when a first version of a data object is updated or altered, a second version of the data object is created from the first version of the data object and the second version of the data object is updated or altered. Because the first version of the data object is not deleted, the update or alteration of the data object can be reversed (or "rolled back") and the first version can be easily restored. Such data storage systems typically provide application programming interface ("API") calls to designate the tip version, which is typically the most recent version by default. Operations performed on the data object (e.g., read, write, delete, etc.) are performed on the tip version by default, with version-changing operations causing a new version to be created and a new tip version to be designated.

Such data storage systems also typically provide API calls to manipulate the other versions in the version chain. For example, API calls may be made to delete other versions in the version chain, to move other versions of the version chain to other data storage classes, to designate other versions of the version chain as the tip version, and so on. In an illustrative example, a versioned data object can be created in a first data storage class (e.g., on-demand storage) and updated in that first data storage class several times during the course of a time period. Each update to the versioned data object is performed on the tip version, each update to the versioned data object causes a new version of the versioned data object to be created, and each update to the versioned data object causes the new version of the versioned data object to be designated as the tip version. After some time period, there may be one tip version of the versioned data object and a plurality of previous versions of the versioned data object stored in on-demand storage. An API call to delete the versioned data object deletes the tip version, and an API call to delete a particular version or range of versions deletes previous versions in the version chain.

Such versioned data storage systems may become complex to manage when the data object is moved or copied between different data storage classes, particularly when those different data storage classes use different key-value pairs or do not use key-value pairs at all. For example, when a versioned data object is moved from on-demand storage to archival storage, the key for the versioned data object in on-demand storage may not be usable for managing the object in archival storage. Additionally, an operation to "move" a versioned data object from on-demand storage to archival storage may not even be a move operation but may instead be a copy operation with a new identifier. Such a copy operation, where a second data object is created in a second data storage class (e.g., archival storage) from a first data object in an first data storage class (e.g., on-demand storage) can result in a loss of previous version information if the key for one data storage class is not valid as a key of another data storage class.

Techniques are described in the preceding and following description to manage versions of data objects across multiple data storage classes. A version metadata management service manages data objects and the associated versions of the data objects across multiple data storage classes using version metadata associated with the data object that associates the different keys for the different data storage classes with a version key that is common to the data object regardless of where the data object is stored. The version metadata management service also manages additional version metadata associated with the data object to provide a version chain for the data object across the multiple data storage classes. The version metadata management service manages the additional version metadata associated with the data object to provide a version chain for the data object across the multiple data storage classes by, for example, performing operations to change or update version metadata when version-changing operations are performed on the data object.

In an illustrative example, a data object is created in on-demand storage and updated. The data object in on-demand storage has a tip version and one or more previous versions in the version chain in on-demand storage. When the object is archived to archival storage, the data object is copied from on-demand storage to archival storage, and the version metadata management service maintains the association between the data object in on-demand storage and the data object in archival storage including, but not limited to, the version of the data object in on-demand storage that was used to create the version of the object in archival storage. A user associated with the data object can then use API calls to update the data object in on-demand storage, delete one or more of the one or more previous versions in the version chain in on-demand storage, update the data object in archival storage, and/or perform other such operations. The customer may also designate one or both of the versions of the data object (e.g., the data object in on-demand storage and/or the data object in archival storage) as tip versions so that, for example, operations performed on the data object can, by default, be performed on the data object in on-demand storage, be performed on the data object in archival storage, or be performed on both the data object in on-demand storage and the data object in archival storage, based at least in part on the operation.

Continuing with the illustrative example described above, if the user later restored the version of the data object from archival storage back to on-demand storage and designated the restored version as the tip version, the version chain would include that restore as the source (also referred to herein as the "history" or "provenance") of the tip version of the data object in on-demand storage. The user could then delete the version of the data object in archival storage or maintain the version of the data object in archival storage without affecting the version history of the data object because the version history of the data object is maintained as version metadata by the version metadata management service.

As described below, multiple versions of the data object can be maintained in multiple data storage classes as well as within the same data storage class (e.g., in multiple locations of a distributed data storage service) and a version history maintained throughout the lifecycle of the data object. The version history can include a history of the version-changing operations performed on the data object. Such a version history can be a simple linear version chain where "branches" in the version chain are pruned from the version chain when those branches do not include the tip version or tip versions. Such a version history can also be represented by a more complex structure such as, for example, a graph (e.g., a directed acyclic graph) where the complete version history of all versions of a data object, including deleted or moved versions, is maintained by the version metadata management service.

The version metadata management service can also maintain subsets of the version history (e.g., the version metadata) of a data object that are specific to a particular data storage class or data storage location. Using the example above, where a data object is created in on-demand storage, moved to archival storage, and later restored to on-demand storage, the version metadata management service may maintain a version history of the data object in on-demand storage. Such a version history may represent the "move to archival storage" and "restore from archival storage" as links in the version history without associated versions in the subset of the version history of the data object.

The version metadata management service can also maintain and/or store version metadata (also referred to herein simply as "metadata") associated with a version of a data object, with that data object so that, for example, services can validate the version of the data object against previous versions of the data object. For example, the version metadata management service can store metadata about a version of a data object that includes the previous version of the data object and, for example, a checksum of that previous version. This metadata can be used by other services to validate that a copy or move of the data object was completed without errors. Such validation can be used to verify that data objects received from outside of the data storage class are valid and imported correctly.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where versioning of a data object stored in multiple data storage classes is managed by a version metadata management service in accordance with an embodiment. In the example environment 100 illustrated in FIG. 1, a user 102 may use a client computing device 104 to connect 106 to a variety of services provided by a computing resource service provider 110 to store data using various data storage services of the computing resource service provider 110 and/or to cause other applications or services of the computing resource service provider 110 to store data using various data storage services of the computing resource service provider 110. The user 102 may use the client computing device 104 to connect 106 to the computing resource service provider 110 over a network 108 such as those networks described herein. The computing resource service provider 110 may provide a distributed, virtualized, and/or datacenter environment within which one or more applications, processes, services, virtual machines, and/or other such computer system entities may be executed. The user 102 may be a person, or may be a process running on one or more remote computer systems, or may be some other computer system entity, user, or process.

Commands from the user 102 to the computing resource service provider 110 to store data in various storage services of the computing resource service provider 110 may originate from an outside computer system or from within the environment of the computing resource service provider 110. The commands to connect 106 to the computing resource service provider 110 may be sent to the computing resource service provider 110 and/or the services operating in the environment therein (e.g., the data storage services and/or the version metadata management service 124), without the direct intervention of the user 102 (i.e., commands to connect 106 to the computing resource service provider 110 may be generated automatically in response to one or more events). The user 102 may be a privileged user associated with a customer of the computing resource service provider 110. The user 102 may also be a privileged user associated with the computing resource service provider 110.

The computing resource service provider 110 may provide access to one or more host machines, may provide access to one or more virtual machine instances as may be operating thereon, or may provide access to one or more services in an environment therein. The one or more services provided by the computing resource service provider 110 may also be implemented as and/or may utilize one or more virtual machine instances as may be operating on host machines operating within the computing resource service provider 110 environment. For example, the computing resource service provider 110 may provide a variety of services to users including, but not limited to, the user 102, and the users may communicate with the computing resource service provider 110 via an interface such as a web interface, an application programming interface ("API"), or any other type of interface. While the example environment illustrated in FIG. 1 shows a single connection or interface to the computing resource service provider 110, each of the services operating in an environment therein may also have their own interfaces and, generally, subsets of the services may have corresponding interfaces in addition to or as an alternative to the single interface.

In an example of a type of service that is not a data storage service operating within the environment of the computing resource service provider 110, a virtual computer system service may be a collection of computing resources configured to instantiate virtual machine instances on behalf of a customer such as the user 102. The customer may interact with a virtual computer system service (via appropriately configured and authenticated API requests) to provision and operate virtual machine instances that are instantiated on physical computing devices hosted and operated by the computing resource service provider 110. The virtual computer system service may provision the instance by instantiating the instance, configuring the instance, and providing resources to run the instance. The virtual computer system service may also be configured to manage virtual machine instances to, for example, instantiate virtual machine instances and/or to manage the migration of virtual machine instances. The virtual machine instances may be used for various purposes, such as to operate as servers supporting a website, to operate business applications or, generally, to serve as computing power for the customer. Other applications for the virtual machine instances may be to support database applications, electronic commerce applications, business applications, and/or other applications. Each of these services and applications may generate data objects that are stored in the environment of the computing resource service provider 110 using data storage services (e.g., the on-demand storage service 112, the archival storage service 116, and/or the backup storage service 120) with version metadata managed by the version metadata management service 124 as described herein.

A data object provided by the user 102 for storage using one or more of the services of the computing resource service provider 110 may be stored in on-demand storage 114 using an on-demand storage service 112. An on-demand storage service 112 is a service that provides high availability and rapid access to data stored using the on-demand storage service 112. For example, the on-demand storage service 112 may be configured to synchronously process requests to store and/or access data. To enable better performance relative to other storage services (e.g., an archival storage service 116 or a backup storage service 120), an on-demand storage service 112 may operate using additional computing resources (e.g., databases) that enable the on-demand storage service 112 to locate and retrieve data quickly relative to other data storage services. The on-demand storage service 112 may also provide synchronous data access. For example, the on-demand storage service 112 may maintain stored data in a manner such that, when a request for a data object is received, the data object can be provided (or streaming of the data object can be initiated) in direct response to the request. When a data object is provided for storage in an on-demand storage service 112, a version metadata management service 124 generates and/or obtains version metadata associated with that data object such as, for example, a version key of the data object usable by the version metadata management service 124 to track versioning of the data object across multiple data storage classes (also referred to herein as a "storage class") including, but not limited to, the on-demand storage service 112.

An on-demand storage service 112 is a collection of computing resources that operate collectively to store data using on-demand storage 114 that is managed by the version metadata management service 124 as described herein. The computing resources configured to store data can include at least one of: computer systems (the computer systems including processors and memory), networks, storage devices, executable code, services, processes, modules, or applications. The computing resources configured to store data can also include virtual systems that are implemented on shared hardware hosted by, for example, a computing resource service provider such as the computing resource service provider 110. In one embodiment, the on-demand storage service 112 is implemented as a single system. In one embodiment, the on-demand storage service 112 is implemented as a distributed system, with a plurality of instances operating collectively to process and resolve data update events. In one embodiment, the on-demand storage service 112 operates using computing resources (e.g., databases and/or virtual machine instances) that enable the on-demand storage service 112 to store, locate, and retrieve stored data quickly, to allow operations to be performed in response to data update events, to allow data to be retrieved from on-demand storage 114, or to allow operations to be performed in response to requests to retrieve stored data (e.g., restore requests).

In one embodiment, the on-demand storage service 112 maintains data and/or metadata associated with the stored data in a manner such that when a request to locate a data item is received, the data can be located, processed, and provided (or a streaming data object can be initiated) in a response to the request. As noted, data stored by the on-demand storage service 112 is, in an embodiment, organized into data objects which are stored as described herein. The data objects may have arbitrary sizes or, in some embodiments, may have constraints on size or durability. Thus, in one embodiment, the on-demand storage service 112 manages numerous data objects of varying sizes. In one embodiment, the on-demand storage service 112 stores the data objects to be stored in storage resources controlled by the on-demand storage service 112 such as, for example, the on-demand storage 114. In one embodiment, the on-demand storage service 112 operates as a key value store that associates the data objects with identifiers of the data objects that are used to store, retrieve, or perform other operations in connection with the data objects managed by the on-demand storage service 112 and stored in on-demand storage 114. The on-demand storage service 112 also, in an embodiment, generates metadata associated with the data objects and stores such metadata with the data objects or in some other determined location.

The on-demand storage service 112 stores such data and metadata in, for example, databases, on hard disk drives, in volatile memory, in non-volatile memory, in block storage, or using some other such storage mechanism using on-demand storage 114. On-demand storage 114 is storage usable by the on-demand storage service 112 to store and maintain the data as described above and may include physical media such as disk drives, optical drives, memory, tape drives, and other such physical media. In an embodiment, the on-demand storage service 112 uses virtualized and/or logical partitions of the physical media to store data in the on-demand storage 114.

A version metadata management service 124 is a service that manages metadata for versioned data objects as described here. Using the example described above, a data object is created in on-demand storage and updated. The version metadata management service 124 maintains metadata for the first version of the data object in on-demand storage and for the updated version of the data object in on-demand storage. The version metadata management service 124 may also maintain metadata indicating that the updated version is the tip version (i.e., the most current version). If the data object is subsequently archived to archival storage, the data object is copied from on-demand storage to archival storage and the version metadata management service 124 maintains the association between the data object in on-demand storage and the data object in archival storage including, but not limited to, the version of the data object in on-demand storage that was used to create the version of the object in archival storage. As described above, one or both of the versions of the data object (e.g., the data object in on-demand storage and/or the data object in archival storage) may be designated as tip versions so that, for example, operations performed on the data object can, by default, be performed on the data object in on-demand storage, be performed on the data object in archival storage, or be performed on both the data object in on-demand storage and the data object in archival storage, based at least in part on the operation.

If the user later restores the version of the data object from archival storage back to on-demand storage and designates the restored version as the tip version, the version chain maintained by the version metadata management service 124 would include that restore as the source (also referred to herein as the "history" or "provenance") of the tip version of the data object in on-demand storage. If the version of the data object in archival storage is then deleted, the version metadata management service 124 may also maintain metadata information for that deletion. In an embodiment, the version metadata management service 124 supports versioning of a data object where a new version of a data object is unchanged from the previous version of the data object except for a version change. That is, the data object may have an updated version but no other changes to the data object. In an embodiment, the version history of the data object includes a history of the version-changing operations (i.e., the operations on the data object that change or update a version identifier of the data object) performed on the data object.

As described above, multiple versions of the data object can be maintained in multiple storage classes as well as in multiple instances of the same storage class (e.g., in multiple zones across a distributed data storage service) and a version history maintained throughout the lifecycle of the data object. Such a version history maintained by the version metadata management service can be a simple linear version chain where "branches" in the version chain are pruned from the version chain when those branches do not include the tip version or tip versions. The version metadata management service 124 can also maintain subsets of the version history of a data object that are specific to a particular storage class or data storage location (also referred to herein as a "storage location") and can maintain and/or store metadata associated with a version of a data object with the data object so that, for example, services can validate the version of the data object against previous versions of the data object. For example, the version metadata management service 124 can store metadata about a version of a data object that includes the previous version of the data object and, for example, a checksum of that previous version. This metadata can be used by other services to validate that a copy or move of the data object was completed without errors. Such validation can be used to verify that data objects received from outside of the storage class are valid and imported correctly.

A version metadata management service 124 is a collection of computing resources that operate collectively to manage the versioning of data stored in the data storage services described herein. The computing resources configured to manage the versioning of data stored in the data storage services can include at least one of: computer systems (the computer systems including processors and memory), networks, storage devices, executable code, services, processes, modules, or applications. The computing resources configured to manage the versioning of data stored in the data storage services can also include virtual systems that are implemented on shared hardware hosted by, for example, a computing resource service provider such as the computing resource service provider 110. In one embodiment, the version metadata management service 124 is implemented as a single system. In one embodiment, the version metadata management service 124 is implemented as a distributed system, with a plurality of instances operating collectively to manage the versioning of data stored in the data storage services. In one embodiment, the version metadata management service 124 operates using computing resources (e.g., databases and/or virtual machine instances) that enable the version metadata management service 124 to manage the versioning of data stored in the data storage services quickly, to allow operations to be performed in response to version-changing data update events, to allow data to be located in data storage as described herein.

Data objects stored in on-demand storage 114 using an on-demand storage service 112 and managed by a version metadata management service 124 may, during the lifecycle of the those data objects, be transferred to an archival storage service 116 and stored in archival storage 118 and/or transferred to a backup storage service 120 and stored in backup storage 122. Additionally, data objects stored in on-demand storage 114 using an on-demand storage service 112 and managed by a version metadata management service 124, data objects stored in archival storage 118 using an archival storage service 116 and managed by a version metadata management service 124, and data objects stored in backup storage 122 using a backup storage service 120 and managed by a version metadata management service 124 may be transferred between these three classes of data storage during the lifecycle of the data object with the versioning of the data object managed by the version metadata management service 124 as described herein.

An archival storage service 116 is a data storage service that may be configured to store data in a manner that reduces the costs of storage at the expense of performance in connection with data access. In an example, an archival storage service 116 may be configured to perform data operations (i.e., store and retrieve data) asynchronously to take advantage of cost savings afforded by batch processing and parallelism. For instance, a client of the archival storage service 116 may receive requests to access data objects stored in the archival storage service 116, aggregate the requests, process the requests in batches, and make the requested data available for retrieval using additional requests. Due to the asynchronous processing, the archival storage service 116 may use additional requests to retrieve a data object once the data object has been made ready for retrieval, such as by reading the data object from one or more archival data storage devices and writing the data to one or more staging data storage devices from which the data object is made available to a user or service. An archival storage service 116 may also use lower cost media such as tapes and tape drives to reduce the cost of storage at the expense of slower access. An archival storage service 116 may also use redundant storage techniques to increase the durability (i.e., the redundancy) of data objects stored thereon.

As with the on-demand storage service 112, an archival storage service 116 is a collection of computing resources that operate collectively to store data using archival storage 118 and managed by the version metadata management service 124 as described herein. The computing resources configured to store data can include at least one of: computer systems (the computer systems including processors and memory), networks, storage devices, executable code, services, processes, modules, or applications. The computing resources configured to store data can also include virtual systems that are implemented on shared hardware hosted by, for example, a computing resource service provider such as the computing resource service provider 110. In one embodiment, the archival storage service 116 is implemented as a single system. In one embodiment, the archival storage service 116 is implemented as a distributed system, with a plurality of instances operating collectively to process and resolve data update events. In one embodiment, the archival storage service 116 operates using computing resources (e.g., databases and/or virtual machine instances) that enable the archival storage service 116 to store, locate, and retrieve stored data quickly, to allow operations to be performed in response to data update events, to allow data to be retrieved from archival storage 118, or to allow operations to be performed in response to requests to retrieve stored data (e.g., restore requests).

In one embodiment, the archival storage service 116 maintains data and/or metadata associated with the stored data in a manner such that, when a request to locate a data item is received, the data can be located, processed, and provided (or a streaming data object can be initiated) in a response to the request. As noted, data stored by the archival storage service 116 is, in an embodiment, organized into data objects which are stored as described herein. The data objects may have arbitrary sizes or, in some embodiments, may have constraints on size or durability. Thus, in one embodiment, the archival storage service 116 manages numerous data objects of varying sizes. In one embodiment, the archival storage service 116 stores the data objects to be stored in storage resources controlled by the archival storage service 116 such as, for example, the archival storage 118. In one embodiment, the archival storage service 116 operates as a key value store that associates the data objects with identifiers of the data objects that are used to store, retrieve, or perform other operations in connection with the data objects managed by the archival storage service 116 and stored in archival storage 118. The archival storage service 116 also, in an embodiment, generates metadata associated with the data objects and stores such metadata with the data objects or in some other determined location.

The archival storage service 116 stores such data and metadata in, for example, databases, on hard disk drives, in volatile memory, in non-volatile memory, in block storage, or using some other such storage mechanism using archival storage 118. Archival storage 118 is storage usable by the archival storage service 116 to store and maintain the data as described above and may include physical media such as disk drives, optical drives, memory, tape drives, and other such physical media. In an embodiment, the archival storage service 116 uses virtualized and/or logical partitions of the physical media to store data in the archival storage 118.

A backup storage service 120 is a data storage service that is configured to store backup data for other storage services. For example, a data storage service such as those described herein may periodically create backups of the data stored thereon. The backups may be full backups (i.e., a complete backup of the data), incremental backups (i.e., a backup of the data that has changed since the previous backup), or a combination of full and incremental backups. As with an archival storage service 116, a backup storage service 120 may be configured to store data in a manner that reduces the costs of storage at the expense of performance in connection with data access. For instance, a client of the backup storage service 120 may receive requests to store data objects stored in the backup storage service 120, aggregate the requests, process the requests in batches, and provide the data for storage as a collective set of data. The backup storage service 120 may use synchronous requests to retrieve a data object (i.e., to restore the data from the backup storage service 120). A backup storage service 120 may also use a variety of different media types, depending on the type of data stored. For example, hourly incremental backups of a data object that are only usable for performing restore operations for a day or two days may be stored in higher cost, faster media while weekly or monthly full backups that are usable for performing restore operations for longer periods of time (e.g., a year or indefinitely) may be stored in lower cost, slower media. An archival storage service 116 may also use redundant storage techniques to increase the durability (i.e., the redundancy) of data objects stored thereon.

As with the on-demand storage service 112 and the archival storage service 116, a backup storage service 120 is a collection of computing resources that operate collectively to store data using backup storage 122 and managed by the version metadata management service 124 as described herein. The computing resources configured to store data can include at least one of: computer systems (the computer systems including processors and memory), networks, storage devices, executable code, services, processes, modules, or applications. The computing resources configured to store data can also include virtual systems that are implemented on shared hardware hosted by, for example, a computing resource service provider such as the computing resource service provider 110. In one embodiment, the backup storage service 120 is implemented as a single system. In one embodiment, the backup storage service 120 is implemented as a distributed system, with a plurality of instances operating collectively to process and resolve data update events. In one embodiment, the backup storage service 120 operates using computing resources (e.g., databases and/or virtual machine instances) that enable the backup storage service 120 to store, locate, and retrieve stored data quickly, to allow operations to be performed in response to data update events, to allow data to be retrieved from backup storage 122, or to allow operations to be performed in response to requests to retrieve stored data (e.g., restore requests).

In one embodiment, the backup storage service 120 maintains data and/or metadata associated with the stored data in a manner such that, when a request to locate a data item is received, the data can be located, processed, and provided (or a streaming data object can be initiated) in a response to the request. As noted, data stored by the backup storage service 120 is, in an embodiment, organized into data objects which are stored as described herein. The data objects may have arbitrary sizes or, in some embodiments, may have constraints on size or durability. Thus, in one embodiment, the backup storage service 120 manages numerous data objects of varying sizes. In one embodiment, the backup storage service 120 stores the data objects to be stored in storage resources controlled by the backup storage service 120 such as, for example, the backup storage 122. In one embodiment, the backup storage service 120 operates as a key value store that associates the data objects with identifiers of the data objects that are used to store, retrieve, or perform other operations in connection with the data objects managed by the backup storage service 120 and stored in backup storage 122. The backup storage service 120 also, in an embodiment, generates metadata associated with the data objects and stores such metadata with the data objects or in some other determined location.

The backup storage service 120 stores such data and metadata in, for example, databases, on hard disk drives, in volatile memory, in non-volatile memory, in block storage, or using some other such storage mechanism using backup storage 122. Backup storage 122 is storage usable by the backup storage service 120 to store and maintain the data as described above and may include physical media such as disk drives, optical drives, memory, tape drives, and other such physical media. In an embodiment, the backup storage service 120 uses virtualized and/or logical partitions of the physical media to store data in the backup storage 122.

It should be noted that while the example environment 100 illustrated in FIG. 1 shows the connection 106 from the user 102 as being to the on-demand storage service 112, the connection 106 from the user 102 may also be to the archival storage service 116, to the backup storage service 120, to the version metadata management service 124, or to another service of the computing resource service provider 110 that uses data storage services such as those described herein.

For example, a virtual machine management service may cause virtual machine instances to be instantiated within the environment of the computing resource service provider 110 that use data storage services such as an on-demand storage service 112, an archival storage service 116, and/or a backup storage service 120 to store data usable by the virtual machine instances.

It should also be noted that while the example environment 100 illustrated in FIG. 1 shows the connection 106 from the user 102 as being to the on-demand storage service 112 from outside of the computing resource service provider 110, the connection 106 may be from a service or user inside of the environment of the computing resource service provider 110.

It should also be noted that while the example environment 100 illustrated in FIG. 1 shows an on-demand storage service 112, an archival storage service 116, and a backup storage service 120, metadata associated with data stored in other types of storage services may be managed by the version metadata management service 124. For example, a file storage service that stores data objects as data files, a block storage service that stores data objects as data blocks, an on-premises storage service that stores data objects on storage devices operated by, for example, a customer of the computing resource service provider 110, or a database service that stores data objects in a database may each have metadata associated with those data objects managed by the version metadata management service 124. As may be contemplated, the examples of the data storage services that store data objects with metadata that is managed by a version metadata management service described herein are illustrative examples, and other types of data storage services that store data objects with metadata that is managed by a version metadata management service may be considered as within the scope of the present disclosure.

Figure 2:
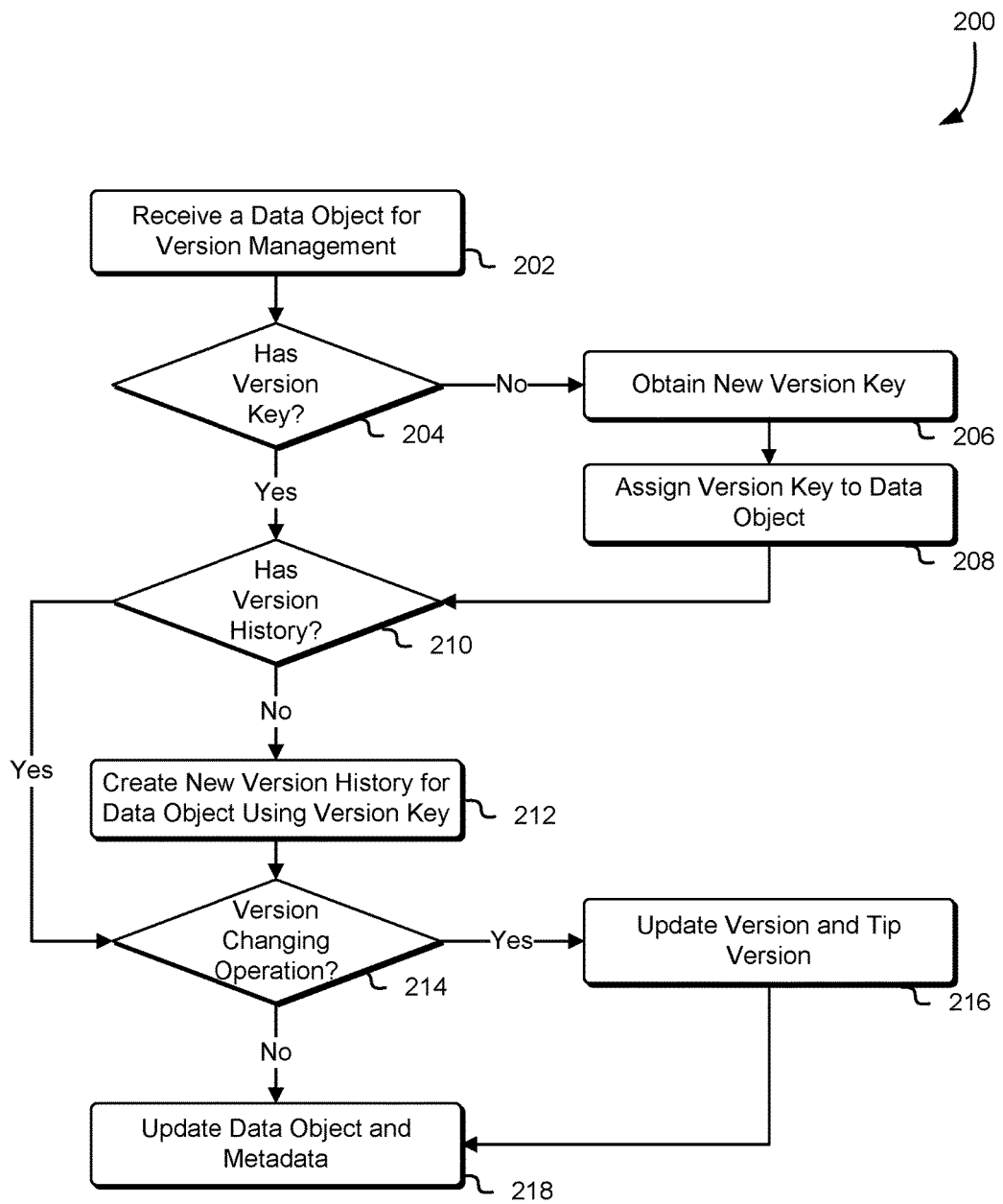
FIG. 2 illustrates an example process for managing versioning of a data object stored in multiple data storage classes using a version metadata management service.

FIG. 2 illustrates an example process 200 for managing versions of a data object stored in multiple data storage classes using a version metadata management service as described in connection with FIG. 1 and in accordance with an embodiment. A version metadata management service such as the version metadata management service 124 described in connection with FIG. 1 performs at least a portion of the example process 200 illustrated in FIG. 2. The version metadata management service first receives 202 a data object that will be managed by the version metadata management service (e.g., a data object that will be stored using a data storage service such as those described herein). The version metadata management service next determines 204 whether the data object has a version key previously assigned. A version key is a unique identifier for the data object that can be used to manage the versioning of the object throughout the lifecycle of the data object. The version key may be a key associated with the data object for a particular class of data storage (e.g., may be a key for the object as stored in on-demand storage) or may be a newly generated key specific to the version metadata management service. In an embodiment, the version key is a globally unique identifier.

If the version metadata management service determines 204 that the data object does not have a version key, the version metadata management service obtains 206 a new version key from, for example, a key generation service or a key repository, and assigns 208 the version key to the data object. The version metadata management service next determines 210 whether the data object has a previously existing version history. The data object may not have a previously existing version history if the object is being newly brought into the data storage classes managed by the version metadata management service. In an example, a newly created object does not have a previously existing version history. In another example, a data object that is imported from a customer data site may or may not have a previously existing version history, depending on whether the customer data site maintains a version history for data objects. In an embodiment, the version metadata management service is configured to read and import version metadata and/or version history for data objects imported from, for example, a customer data site that maintains a version history for data object.

If the version metadata management service determines 210 that the data object does not have a previously existing version history, the version metadata management service may create 212 a new version history for the data object and associate that new version history for the data object with the data object using the version key. For example, the new version history may include an indication that the data object was created or imported, at what time the new data object was created or imported, how the new data object was created or imported, whether any version history was also imported, and other such version history. The version history is one part of the version metadata managed by the version metadata management service for the data object.

The version metadata management service next determines 214 whether the data object is a data object that is being received as a result of a version-changing operation. As used herein, a version-changing operation is an operation that results in a change to a version identifier of the data object (i.e., operations that update a version identifier), where the version identifier may be, for example, a version number, a global unique identifier, a uniform resource locator, or some other version identifier. In an example of a version-changing operation, a copy of a data object from a first data storage class to a second data storage class may be a version-changing operation when the copy operation updates the current version identifier of the data object in the first storage class to an updated version identifier in the second storage class. In another example of a version-changing operation, an update operation may be a version-changing operation when, for example, the update changes the contents of the data object and, as a result of the update, updates the current version identifier of the data object to an updated version identifier. In another example of a version changing operation, a move operation that moves a data object from a first data storage location using a first data storage class and/or using a first data storage service to a second data storage location that is different from the first data storage location may be a version-changing operation when the move operation updates the current version identifier of the data object in the first storage location to an updated version identifier in the second storage location. In another example of a version-changing operation, an operation that copies a data object within a storage class may be a version-changing operation when the copy operation updates the current version identifier of the data object in the storage class (i.e., a copy from a first storage class to a second storage class may be a version-changing operation when the first storage class and the second storage class are the same storage class). As may be contemplated, the examples of version-changing operations described herein are illustrative examples, and other version-changing operations may be considered as within the scope of the present disclosure.

If the version metadata management service determines 214 that the data object is a data object that is being received as a result of a version-changing operation, the version metadata management service may update 216 a version identifier for the data object (also referred to herein more simply as "updating the version of the data object") and/or update the tip version for the data object as described below. Finally, the version metadata management service may update 218 the data object and/or update metadata associated with the data object.

Figure 3:
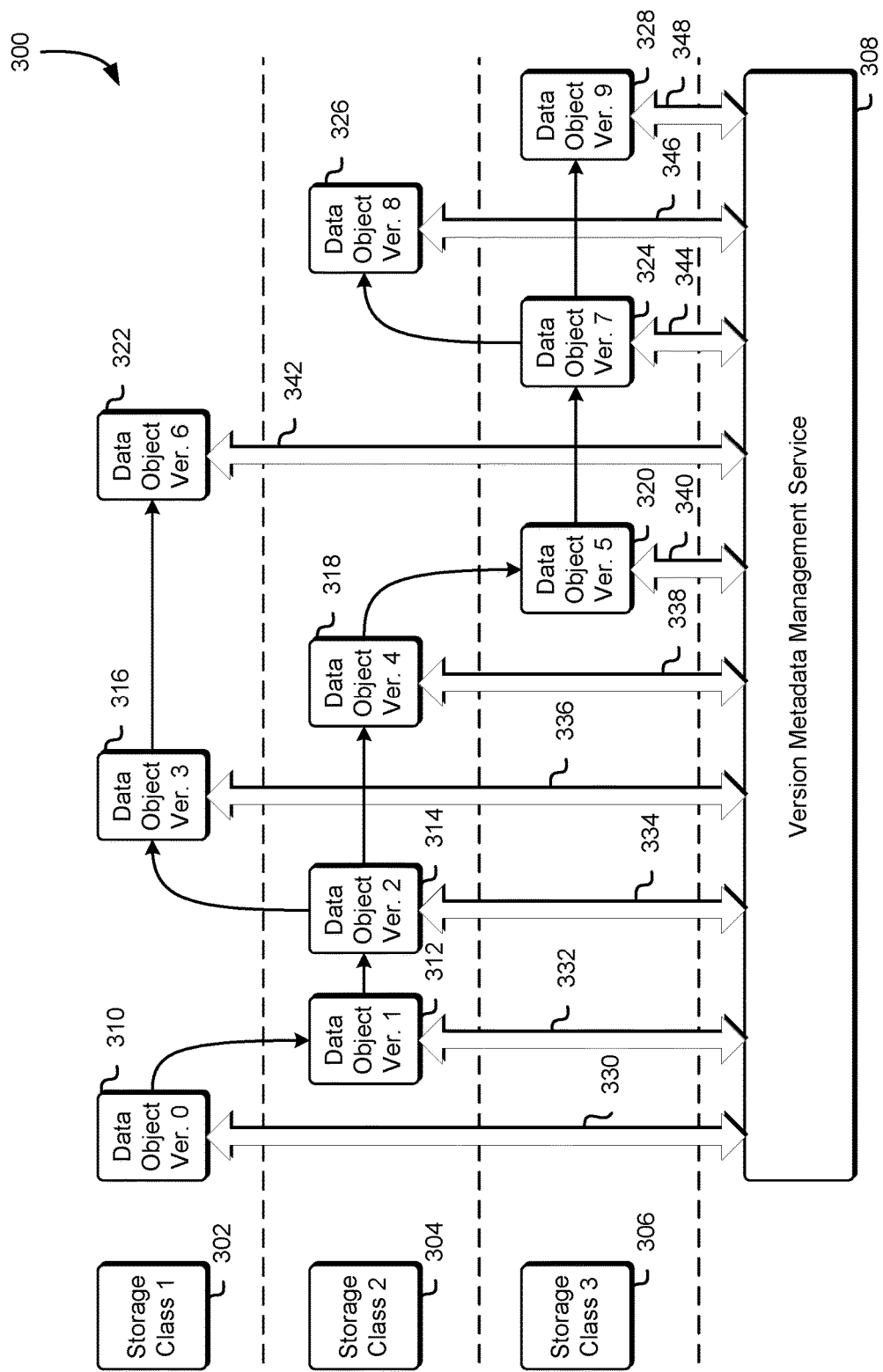
FIG. 3 illustrates an example environment where multiple versions of a data object stored in multiple data storage classes are managed by a version metadata management service.

FIG. 3 illustrates an example environment 300 where multiple versions of a data object stored in multiple data storage classes are managed by a version metadata management service as described in connection with FIG. 1 and in accordance with an embodiment. Version zero 310 of a data object is stored in a first data storage class 302 and managed 330 by a version metadata management service 308 using a version key as described above. The data object is then moved to a second data storage class 304 in a version-changing operation, creating version one 312 of the data object that is stored in the second data storage class 304 and managed 332 by the version metadata management service 308 using the version key. In the example environment 300 illustrated in FIG. 3, the move operation (i.e., the move that creates version one 312 of the data object) results in the deletion of version zero 310 of the data object, resulting in a single version (e.g., version one 312 of the data object) being stored in data storage and being managed by the version metadata management service 308. In an embodiment, a move operation such as the move that creates version one 312 of the data object does not result in the deletion of version zero 310 of the data object, resulting in two versions (e.g., version zero 310 and version one 312) being stored in data storage, with both versions managed by the version metadata management service 308.

In an illustrative example of the move operation that creates version one 312 of the data object, the first data storage class 302 is on-demand storage managed by an on-demand storage service such as the on-demand storage service 112 described in connection with FIG. 1 and stored in on-demand storage such as the on-demand storage 114 also described in connection with FIG. 1. In the illustrative example, the second data storage class 304 is archival storage managed by an archival storage service such as the archival storage service 116 described in connection with FIG. 1 and stored in archival storage such as the archival storage 118 also described in connection with FIG. 1. In the illustrative example, the move operation that creates version one 312 of the data object is a move of the data object from on-demand storage to archival storage, as described above.

The data object is then updated within the second data storage class 304 by, for example, altering the contents of the data object. The update is a version-changing operation that causes the creation of version two 314 of the data object, which is also stored in the second data storage class 304 and managed 334 by the version metadata management service 308 using the version key.

The data object is then copied from version two 314 of the data object in the second data storage class 304 back to the first data storage class 302 in a version-changing operation, creating version three 316 of the data object that is stored in the first data storage class 302 and managed 336 by the version metadata management service 308 using the version key. In the example environment 300 illustrated in FIG. 3, the copy operation (i.e., the copy that creates version three 316 of the data object) does not result in the deletion of version two 314 of the data object.

The data object is then updated within the second data storage class 304. The update is a version-changing operation that causes the creation of version four 318 of the data object from version two 314 of the data object. Version four 318 of the data object is stored in the second data storage class 304 and managed 338 by the version metadata management service 308 using the version key.

The data object is then moved from the second data storage class 304 to a third data storage class 306, which may be, for example, backup storage managed by a backup storage service such as the backup storage service 120 described in connection with FIG. 1 and stored in backup storage such as the backup storage 122 also described in connection with FIG. 1. The move is a version-changing operation that causes the creation of version five 320 of the data object from version four 318 of the data object. Version five 320 of the data object is stored in the third data storage class 306 and managed 340 by the version metadata management service 308 using the version key.

The data object is then updated within the first data storage class 302. The update is a version-changing operation that causes the creation of version six 322 of the data object from version three 316 of the data object. Version six 322 of the data object is stored in the first data storage class 302 and managed 342 by the version metadata management service 308 using the version key.

The data object is then updated within the third data storage class 306. The update is a version-changing operation that causes the creation of version seven 324 of the data object from version five 320 of the data object. Version seven 324 of the data object is stored in the third data storage class 306 and managed 344 by the version metadata management service 308 using the version key.

The data object is then copied from version seven 324 of the data object in the third data storage class 306 back to the second data storage class 304 in a version-changing operation, creating version eight 326 of the data object that is stored in the second data storage class 304 and managed 346 by the version metadata management service 308 using the version key.

Finally, the data object is updated within the third data storage class 306. The update is a version-changing operation that causes the creation of version nine 328 of the data object from version seven 324 of the data object. Version nine 328 of the data object is stored in the third data storage class 306 and managed 348 by the version metadata management service 308 using the version key.

In the example environment 300 illustrated in FIG. 3, the moved versions of the data object (e.g., version zero 310 of the data object, version four 318 of the data object, and version seven 324 of the data object) may be deleted as part of the move operation as described above and so may not exist or may exist only as tombstone versions of the data object, as described below.

It should be noted that, as used herein, the different data storage classes such as the first data storage class 302, the second data storage class 304, and/or the third data storage class 306 may encompass data storage provided by different data storage services such as those described above. For example, the on-demand storage service 112, the archival storage service 116, and the backup storage service 120 are each different data storage classes. The different data storage classes may also be different types of data storage within a particular data storage service. For example, "current" on-demand storage and "archival" on-demand storage are each different data storage classes. The different data storage classes may also be different data storage locations within a particular data storage service. For example, archival storage in a first data storage location (e.g., at a first geographical location) and archival storage in a second data storage location (e.g., at a second geographical location geographically separated from the first geographical location) are each different data storage classes. Different data storage classes such as the first data storage class 302, the second data storage class 304, and/or the third data storage class 306 may have different data storage services, different data storage types within a data storage service, different data storage locations within a data storage service, or combinations of these and/or other different data storage attributes.

As may be contemplated, the version-changing operations described in connection with FIG. 3 (e.g., a move operation, a copy operation, and an update operation) are illustrative examples of version-changing operations and other such version-changing operations may be considered as within the scope of the present disclosure.

Figure 4:
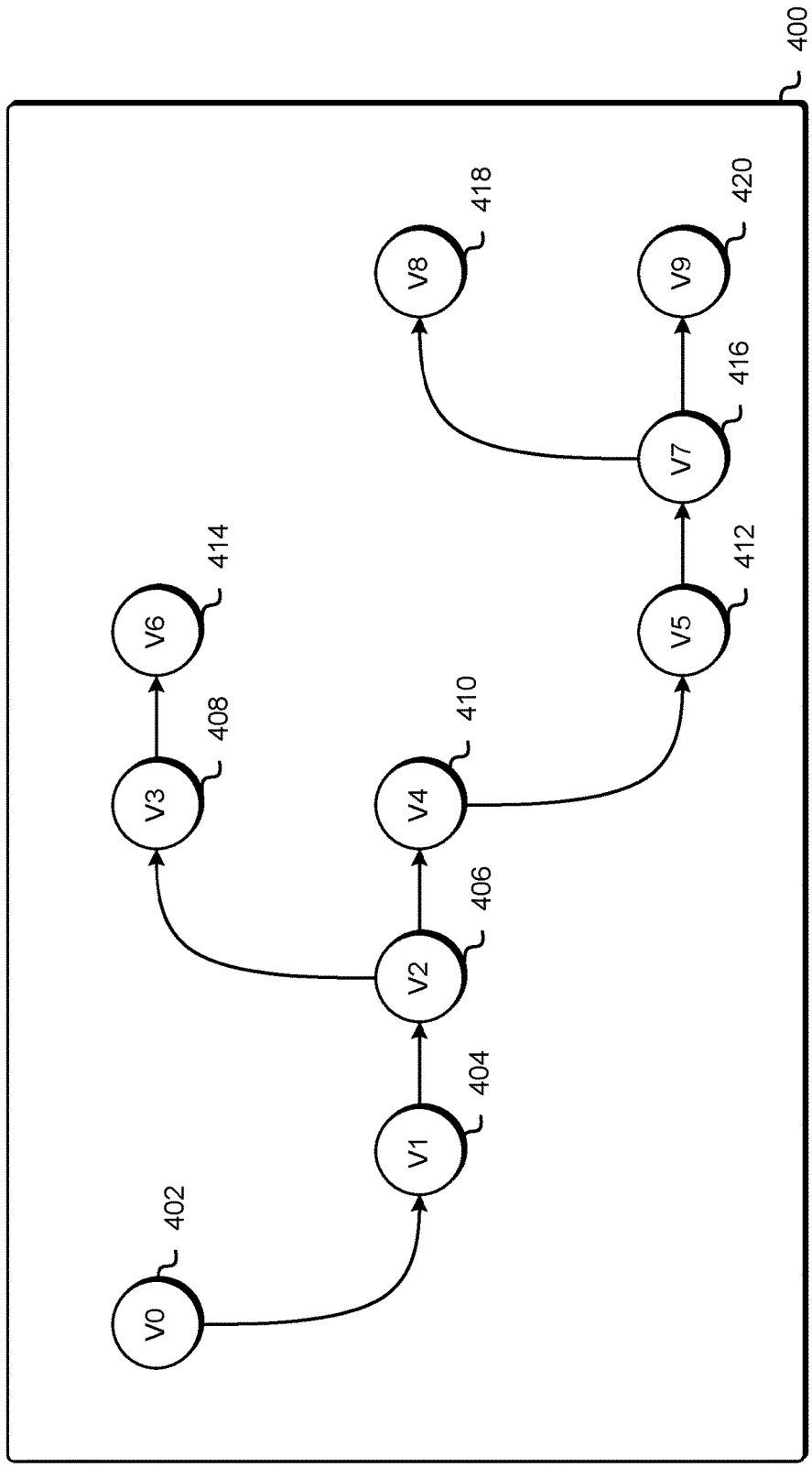
FIG. 4 illustrates an example representation of a version history of multiple versions of a data object stored in multiple data storage classes that is managed using a version metadata management service.

FIG. 4 illustrates an example representation 400 of a version history of multiple versions of a data object stored in multiple data storage classes that is managed using a version metadata management service as described in connection with FIG. 1 and in accordance with an embodiment. The example representation 400 of the version history of multiple versions of a data object stored in multiple storage classes that is managed using a version metadata management service illustrated in FIG. 4 is a directed acyclic graph ("DAG") where the nodes of the DAG represent versions of the data object and the edges of the DAG that connect pairs of nodes in the DAG represent version-changing operations as described above. In the example representation 400 of the version history of multiple versions of a data object stored in multiple storage classes that is managed using a version metadata management service illustrated in FIG. 4, the direction of the edges is illustrated as pointing from the previous version to the next version. In an embodiment, the direction of the edges point from the next version to the previous version (i.e., they are "back-pointers") so that the DAG can be traversed from the tip versions (e.g., version six 322 of the data object, version eight 326 of the data object, and version nine 328 of the data object, all described in connection with FIG. 3) back through the history to version zero 310 of the data object, also described in connection with FIG. 3. In an embodiment, the metadata managed by the version metadata management service includes back-pointers to the previous version in the version chain.

The example representation 400 of the version history of multiple versions of a data object stored in multiple storage classes that is managed using a version metadata management service illustrated in FIG. 4 corresponds to the example environment 300 illustrated in connection with FIG. 3 in that node 402 represents data version zero 310 of the data object, node 404 represents data version one 312 of the data object, node 406 represents data version two 314 of the data object, node 408 represents data version three 316 of the data object, node 410 represents data version four 318 of the data object, node 412 represents data version five 320 of the data object, node 414 represents data version six 322 of the data object, node 416 represents data version seven 324 of the data object, node 418 represents data version eight 326 of the data object, and node 420 represents data version nine 328 of the data object.

Figure 5:
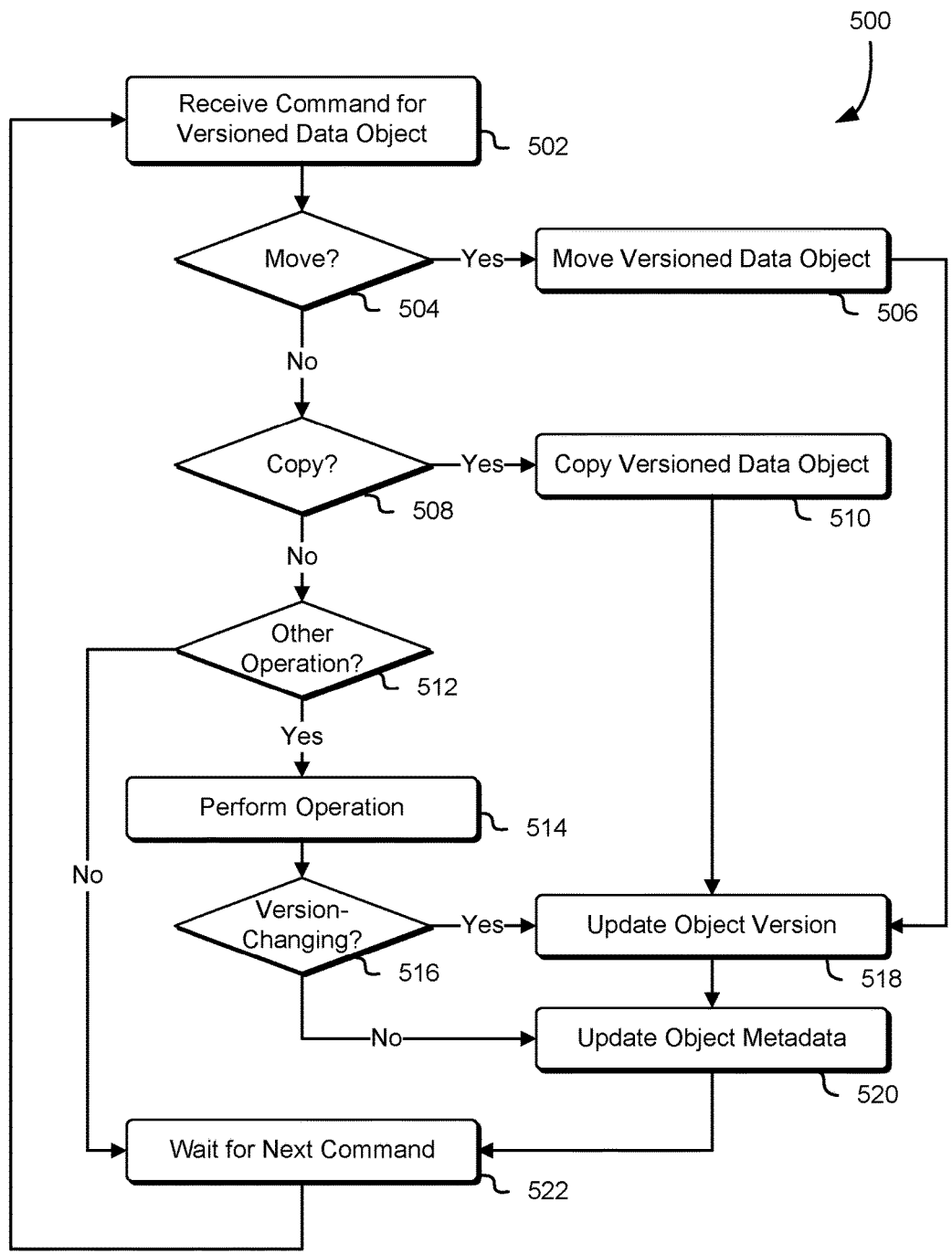
FIG. 5 illustrates an example process for performing version-changing operations on a versioned data object stored in multiple data storage classes and managing versioning of that object using a version metadata management service.

FIG. 5 illustrates an example process 500 for performing version-changing operations on a versioned data object stored in multiple data storage classes and managing versioning of that object using a version metadata management service as described in connection with FIG. 1 and in accordance with an embodiment. A version metadata management service such as the version metadata management service 124 described in connection with FIG. 1 performs at least a portion of the example process 500 illustrated in FIG. 5. In the example process 500 illustrated in FIG. 5, the version metadata management service first receives 502 a command related to a versioned data object. If the command causes a move 504 of the versioned data object from, for example, a first data storage class to a second data storage class, the data storage services will move the versioned data object 506, update 518 the object version, update 520 the object metadata, and wait 522 for the next command.

In some embodiments, the version metadata management service will cause the data storage services to delete the versioned data object in the first data storage class after copying the versioned data object to the second data storage class. In an embodiment where the version metadata management service causes the data storage services to delete the versioned data object in the first data storage class after copying the versioned data object to the second data storage class, the version metadata management service designates, in metadata associated with the deleted version of the versioned data structure, that the version was deleted. In an embodiment where the version metadata management service causes the data storage services to delete the versioned data object in the first data storage class after copying the versioned data object to the second data storage class, the version metadata management service designates the metadata associated with the deleted version as a tombstone (e.g., with metadata but no corresponding data) as described below.

If the command causes a copy 508 of the versioned data object from, for example, a first data storage class to a second data storage class, the data storage services will copy the versioned data object 510 and also update 518 the object version, update 520 the object metadata, and wait 522 for the next command.

If the command causes another operation 512 to be performed on the versioned data object, the version metadata management service may first perform 514 the other operation and then determine 516 whether the other operation is a version-changing operation (e.g., a delete, an update, etc.). If the version metadata management service does determine 516 that the other operation is a version-changing operation, the version metadata management service will update 518 the object version, update 520 the object metadata, and wait 522 for the next command.

Figure 6:
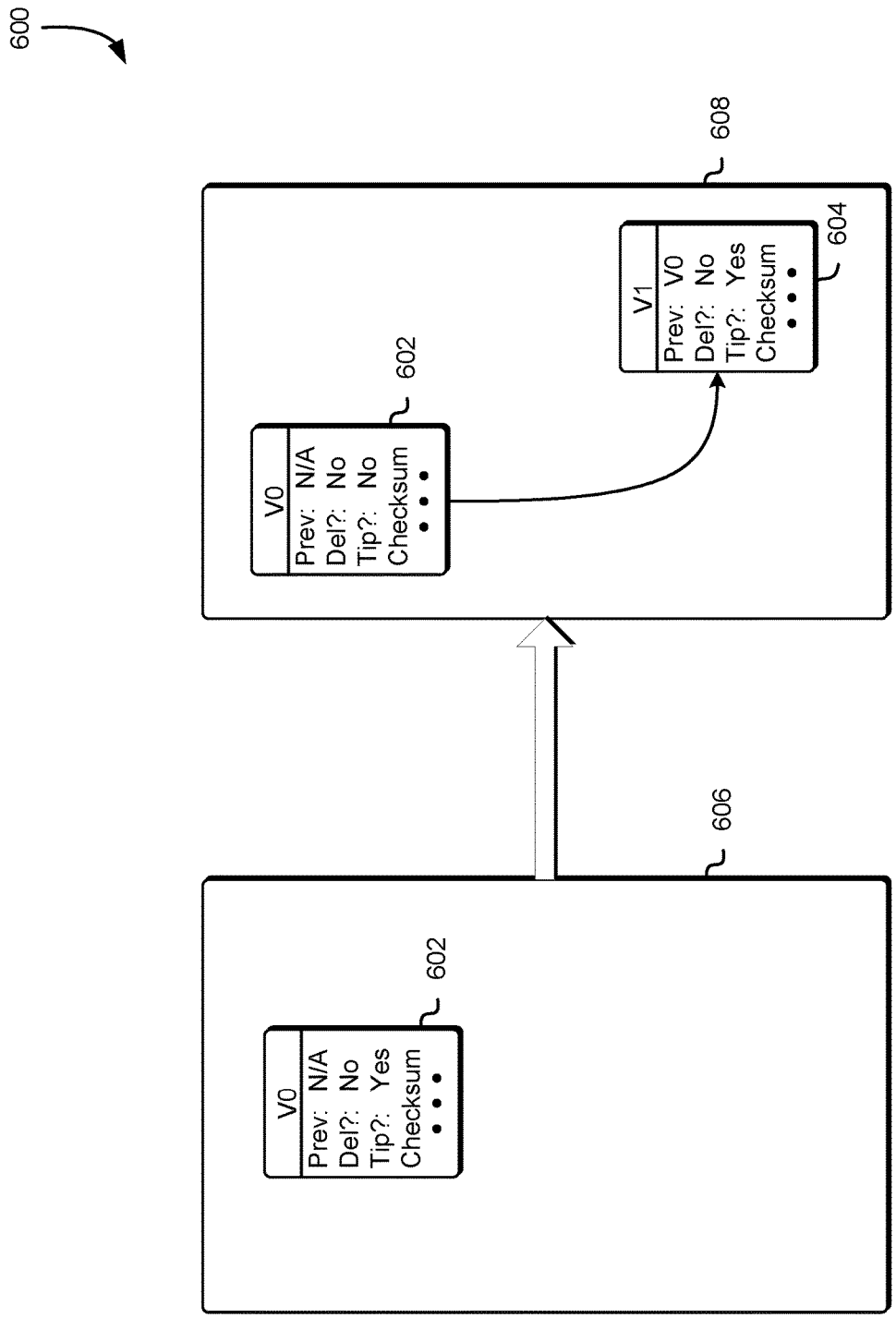
FIG. 6 illustrates an example environment where the first two iterations of a series of version-changing operations on a versioned data object stored in multiple data storage classes is managed using a version metadata management service.

FIG. 6 illustrates an example environment 600 where the first two iterations of a series of version-changing operations on a versioned data object stored in multiple data storage classes is managed using a version metadata management service as described in connection with FIG. 1 and in accordance with an embodiment. In the example environments illustrated in FIGS. 6-10, the nodes with metadata such as node with metadata 602 correspond to the versions of the data object described above. For example, the node with metadata 602 that is denoted as "V0" corresponds to version zero 310 of the data object described in connection with FIG. 3 and the node with metadata 604 that is denoted "V1" corresponds to version one 312 of the data object described in connection with FIG. 3. Similarly, in the example environments illustrated in FIGS. 6-10, a node with metadata such as the node with metadata 602 that is denoted as "V0" in FIG. 6 corresponds to the node with metadata 702 that is denoted as "V0" in FIG. 7, corresponds to the node with metadata 802 that is denoted as "V0" in FIG. 8, corresponds to the node with metadata 902 that is denoted as "V0" in FIG. 9, and corresponds to the node with metadata 1002 that is denoted as "V0" in FIG. 10.

In the example environment 600 illustrated in FIG. 6, a first iteration 606 of the process for creating the version history described at least in connection with FIG. 3 is illustrated. The node with metadata 602 in the first iteration 606 has metadata indicating that it has no previous version, that it has not been deleted, that it is a tip version (i.e., is the most recent version for this particular storage class). After the move operation that creates the second version of the data object described above, the node with metadata 602 in the second iteration 608 has metadata indicating that it has no previous version, that it has not been deleted, and that it is not a tip version and the node with metadata 604 has metadata indicating that "V0" is the previous version (e.g., version zero of the data object), that it has not been deleted, and that it is the tip version. Each of the nodes with metadata illustrated in FIGS. 6-10 may include a checksum usable to verify and/or validate the data as well as other metadata as described herein.

Figure 7:
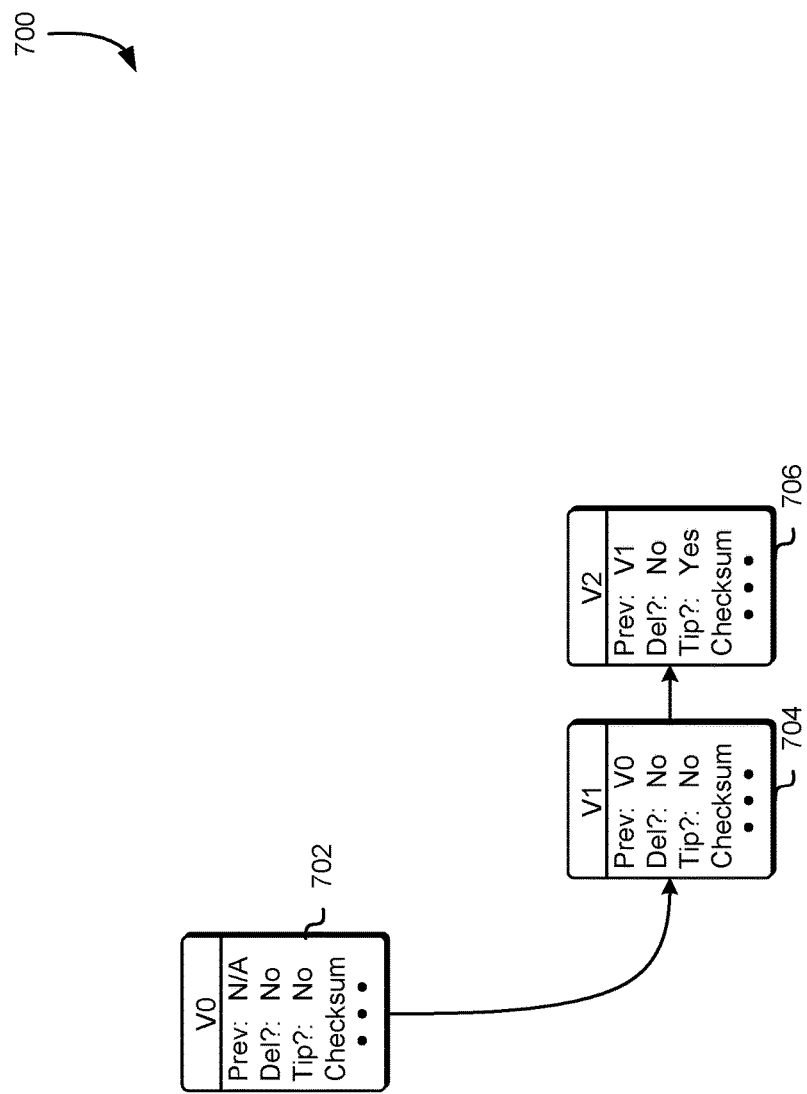
FIG. 7 illustrates an example environment where the third iteration of a series of version-changing operations on a versioned data object stored in multiple data storage classes is managed using a version metadata management service.

FIG. 7 illustrates an example environment 700 where the third iteration of a series of version-changing operations on a versioned data object stored in multiple data storage classes is managed using a version metadata management service as described in connection with FIG. 1 and in accordance with an embodiment. After the update operation that creates the second version of the data object described above, the node with metadata 702 has metadata indicating that it has no previous version, that it has not been deleted, and that it is not a tip version, the node with metadata 704 has metadata indicating that "V0" is the previous version, that it has not been deleted, and that it is not the tip version, and the node with metadata 706 has metadata indicating that "V1" is the previous version, that it has not been deleted, and that it is the tip version.

Figure 8:
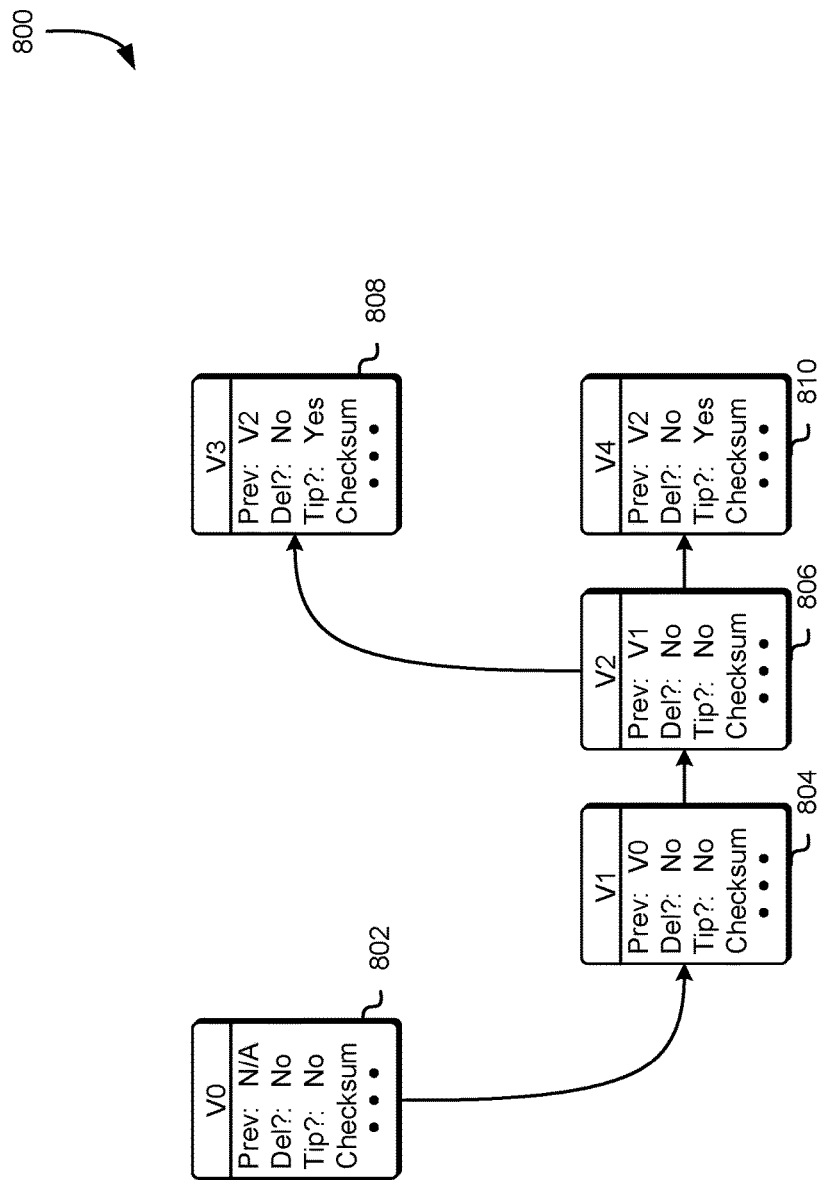
FIG. 8 illustrates an example environment where the fourth iteration of a series of version-changing operations on a versioned data object stored in multiple data storage classes is managed using a version metadata management service.

FIG. 8 illustrates an example environment 800 where the fourth iteration of a series of version-changing operations on a versioned data object stored in multiple data storage classes is managed using a version metadata management service as described in connection with FIG. 1 and in accordance with an embodiment. After the copy operation that creates the third version of the data object and the update operation that creates the fourth version of the data object, the node with metadata 802 has metadata indicating that it has no previous version, that it has not been deleted, and that it is not a tip version, the node with metadata 804 has metadata indicating that "V0" is the previous version, that it has not been deleted, and that it is not the tip version, the node with metadata 806 has metadata indicating that "V1" is the previous version, that it has not been deleted, and that it is not the tip version, the node with metadata 808 has metadata indicating that "V2" is the previous version, that it has not been deleted, and that it is a tip version, and the node with metadata 810 has metadata indicating that "V2" is the previous version, that it has not been deleted, and that it is also a tip version. In the example environment 800 illustrated in FIG. 8, both the node with metadata 808 and the node with metadata 810 are tip versions of, in this example, storage class one and storage class two, respectively.

Figure 9:
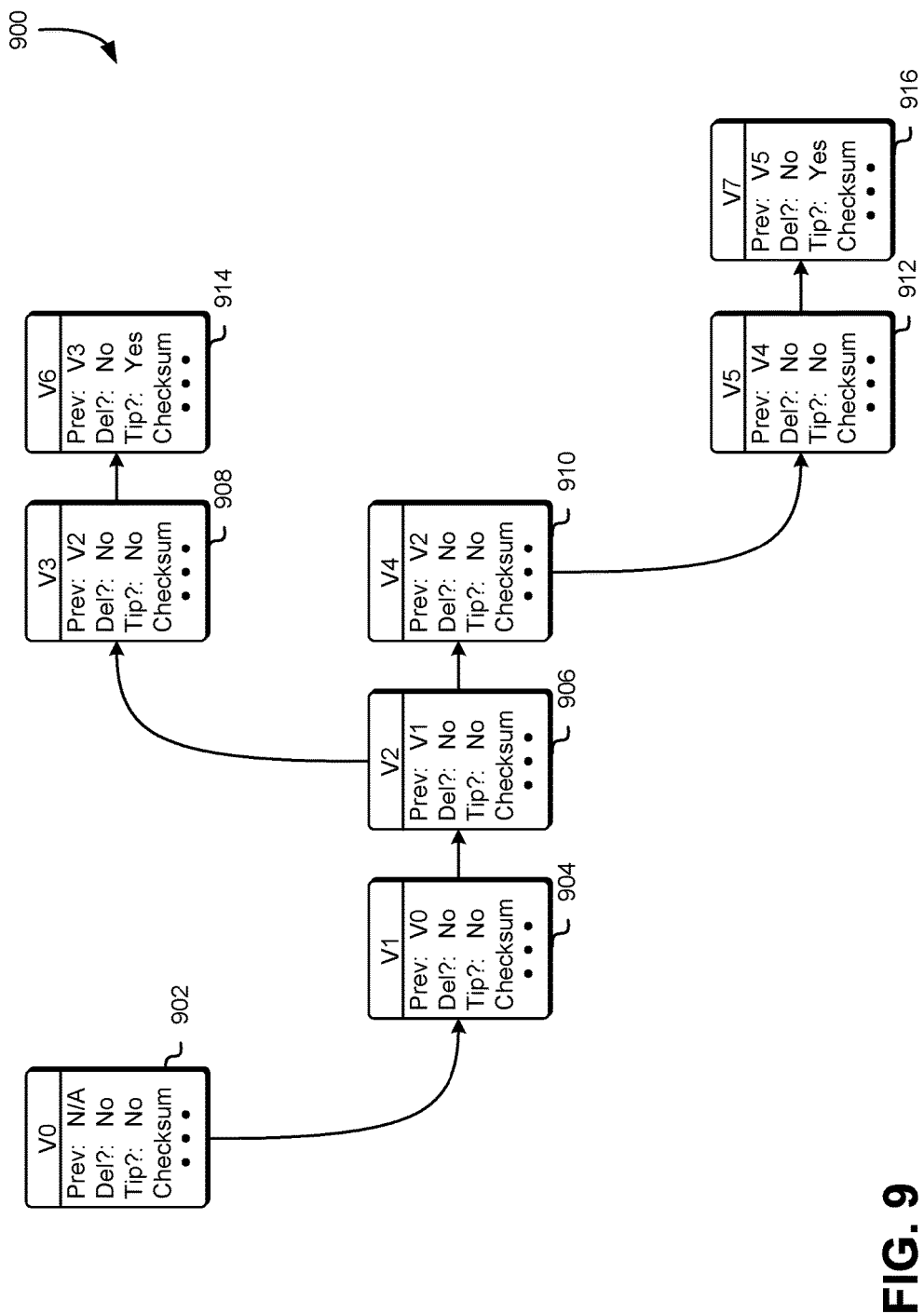
FIG. 9 illustrates an example environment where the fifth iteration of a series of version-changing operations on a versioned data object stored in multiple data storage classes is managed using a version metadata management service.

FIG. 9 illustrates an example environment 900 where the fifth iteration of a series of version-changing operations on a versioned data object stored in multiple data storage classes is managed using a version metadata management service as described in connection with FIG. 1 and in accordance with an embodiment. After the move operation that creates the fifth version of the data object, the update operation that creates the sixth version of the data object, and the update operation that creates the seventh version of the data object, the node with metadata 902 has metadata indicating that it has no previous version, that it has not been deleted, and that it is not a tip version, the node with metadata 904 has metadata indicating that "V0" is the previous version, that it has not been deleted, and that it is not the tip version, the node with metadata 906 has metadata indicating that "V1" is the previous version, that it has not been deleted, and that it is not the tip version, the node with metadata 908 has metadata indicating that "V2" is the previous version, that it has not been deleted, and that it is not the tip version, the node with metadata 910 has metadata indicating that "V2" is the previous version, that it has not been deleted, and that it is not a tip version, the node with metadata 912 has metadata indicating that "V4" is the previous version, that it has not been deleted, and that it is not a tip version, the node with metadata 914 has metadata indicating that "V3" is the previous version, that it has not been deleted, and that it is a tip version, and the node with metadata 916 has metadata indicating that "V5" is the previous version, that it has not been deleted, and that it is also a tip version.

Although not shown in the example environment 900 illustrated in FIG. 9, after the move operation that creates the fifth version of the data object and before the update operation that creates the seventh version of the data object, the node with metadata 912 may be a tip version. Additionally, as with the example environment 800 illustrated in FIG. 8, both the node with metadata 914 and the node with metadata 916 are tip versions of, in this example, storage class one and storage class three, respectively.

Figure 10:
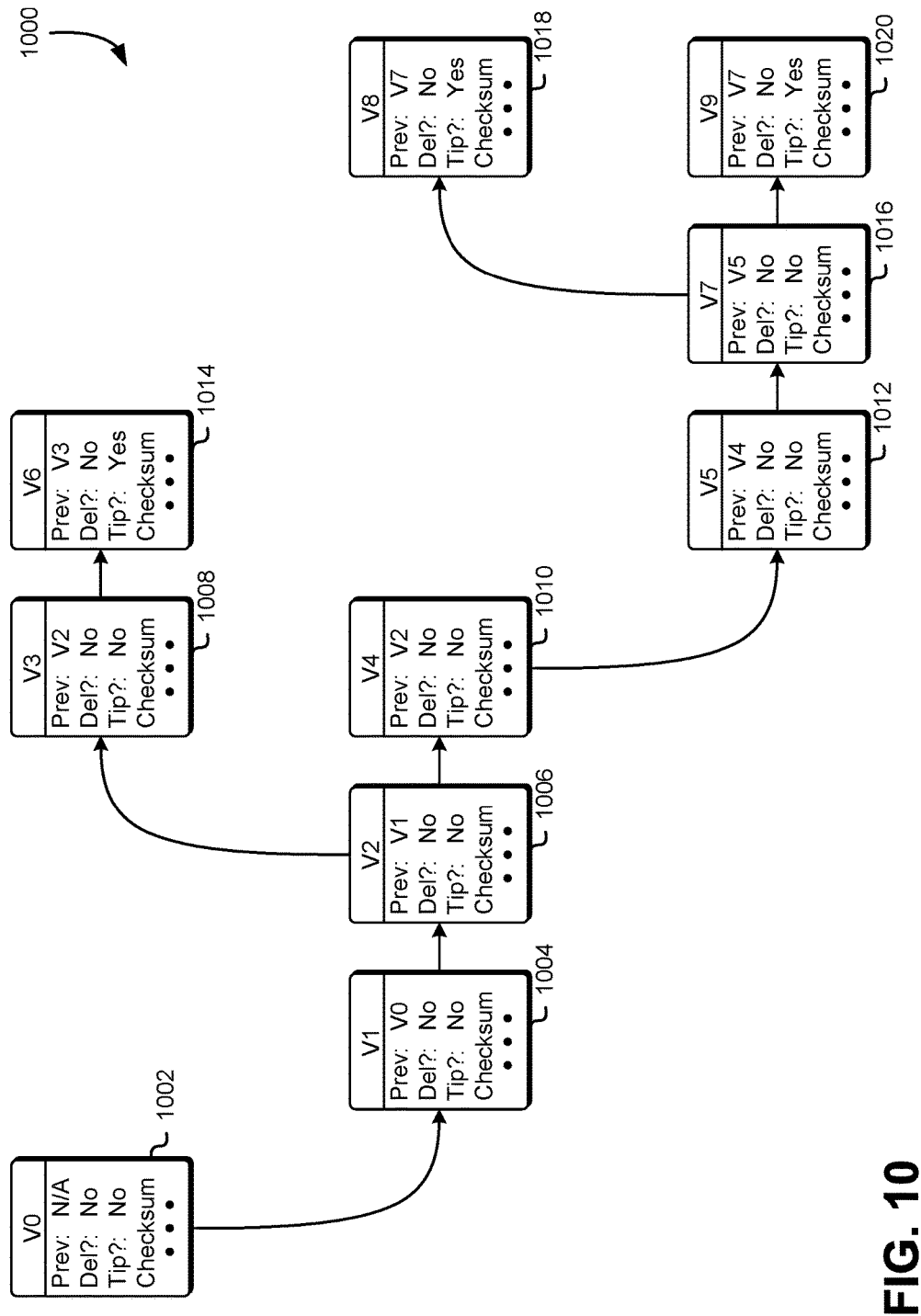
FIG. 10 illustrates an example environment where the sixth iteration of a series of version-changing operations on a versioned data object stored in multiple data storage classes is managed using a version metadata management service.

FIG. 10 illustrates an example environment 1000 where the sixth iteration of a series of version-changing operations on a versioned data object stored in multiple data storage classes is managed using a version metadata management service as described in connection with FIG. 1 and in accordance with an embodiment. After the copy operation that creates the eighth version of the data object and the update operation that creates the ninth version of the data object, the node with metadata 1002 has metadata indicating that it has no previous version, that it has not been deleted, and that it is not a tip version, the node with metadata 1004 has metadata indicating that "V0" is the previous version, that it has not been deleted, and that it is not the tip version, the node with metadata 1006 has metadata indicating that "V1" is the previous version, that it has not been deleted, and that it is not the tip version, the node with metadata 1008 has metadata indicating that "V2" is the previous version, that it has not been deleted, and that it is not the tip version, the node with metadata 1010 has metadata indicating that "V2" is the previous version, that it has not been deleted, and that it is not a tip version, the node with metadata 1012 has metadata indicating that "V4" is the previous version, that it has not been deleted, and that it is not a tip version, the node with metadata 1014 has metadata indicating that "V3" is the previous version, that it has not been deleted, and that it is a tip version, the node with metadata 1016 has metadata indicating that "V5" is the previous version, that it has not been deleted, and that it is not a tip version, the node with metadata 1018 has metadata indicating that "V7" is the previous version, that it has not been deleted, and that it is a tip version, and the node with metadata 1020 has metadata indicating that "V7" is also the previous version, that it has not been deleted, and that it is also a tip version. In the example environment 1000 illustrated in FIG. 10, the node with metadata 1014, the node with metadata 1018, and the node with metadata 1020 are tip versions of, in this example, storage classes one, two, and three, respectively.

Figure 11:
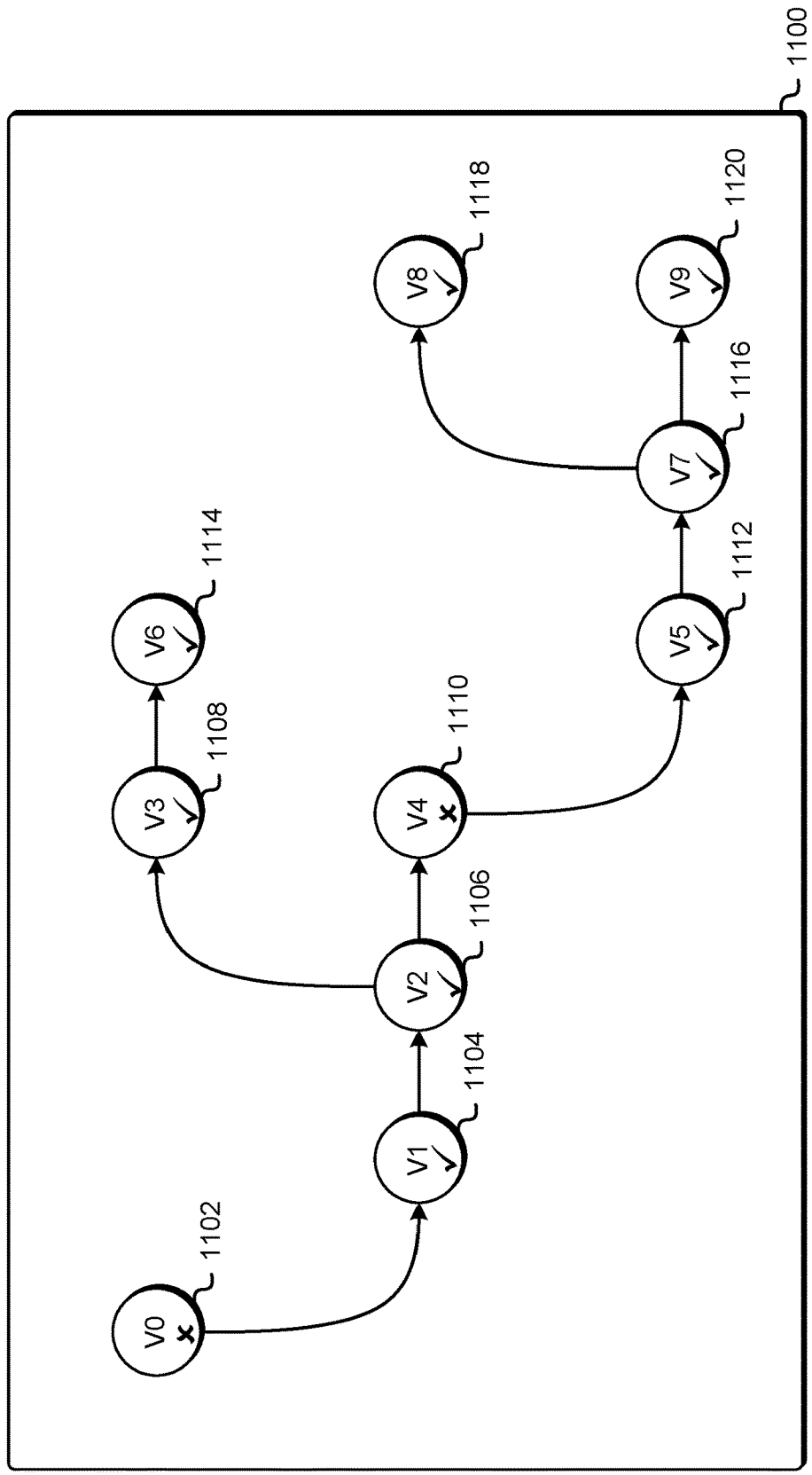
FIG. 11 illustrates an example representation of a version history of multiple versions of a data object stored in multiple data storage classes that is managed using a version metadata management service.

FIG. 11 illustrates an example representation 1100 of a version history of multiple versions of a data object stored in multiple data storage classes that is managed using a version metadata management service as described in connection with FIG. 1 and in accordance with an embodiment. In the example representation 1100 illustrated in FIG. 11, version zero of the data object, represented by node 1102, was deleted as a result of the move operation to create version one of the data object as described above. In the example representation 1100 illustrated in FIG. 11, a deleted data object is represented by a "tombstone" node (e.g., with an "X" mark) where there may be no data corresponding to the node but where there is metadata associated with the node (e.g., previous version, checksum, etc.). In the example representation 1100 illustrated in FIG. 11, node 1110 is also a tombstone node with metadata and no data while node 1104, node 1106, node 1108, node 1112, node 1114, node 1116, node 1118, and node 1120 are not tombstone nodes.

In an embodiment where a user can delete nodes from a version history using API calls as described above, additional tombstone nodes may be created. For example, if a user made an API call to delete data version one, data version two, and data version four in the second storage class after data version eight was created by the copy operation from data version seven, node 1104 and node 1106 would also be tombstone nodes.

Figure 12:
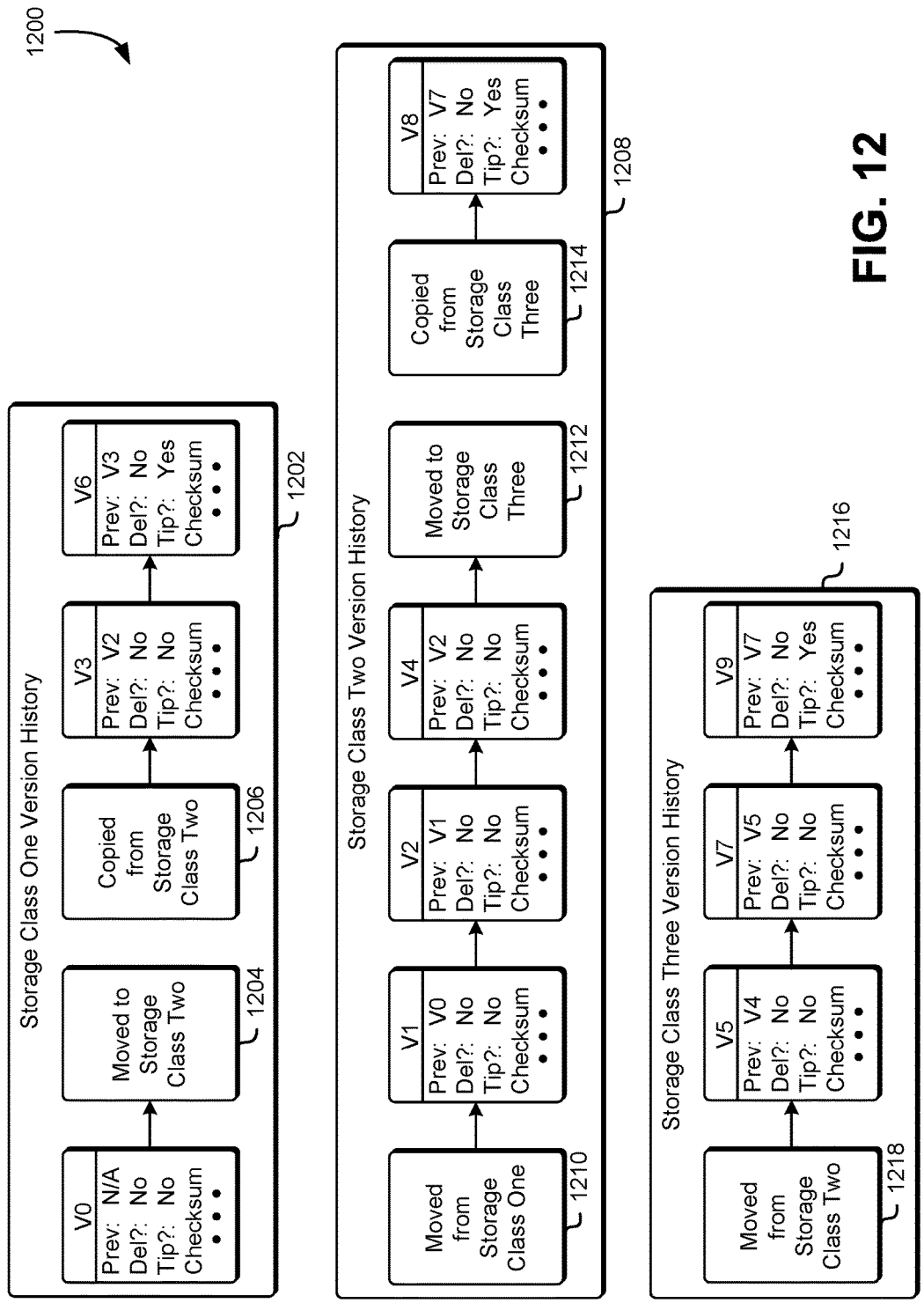
FIG. 12 illustrates an example diagram showing three storage class specific representations of a version history of a data object stored in multiple data storage classes that is managed using a version metadata management service.

FIG. 12 illustrates an example diagram 1200 showing three storage class specific representations of a version history of a data object stored in multiple data storage classes that is managed using a version metadata management service as described in connection with FIG. 1 and in accordance with an embodiment. In addition to the nodes with metadata described above, the storage class specific representations of a version history of a data object may include additional nodes representing version-changing operations related to other storage classes.

In the example diagram 1200 illustrated in FIG. 12, the storage class one version history 1202 includes a node 1204 representing the move of version zero of the data object from storage class one to storage class two and a node 1206 representing the copy of version three of the data object from storage class two back to storage class one. In the example diagram 1200 illustrated in FIG. 12, there is no link between the node 1204 representing the move of version zero of the data object from storage class one to storage class two and the node 1206 representing the copy of version three of the data object from storage class two back to storage class one as there is a break in the version history for the data object in this storage class.

Also in the example diagram 1200 illustrated in FIG. 12, the storage class two version history 1208 includes a node 1210 representing the move of version one of the data object from storage class one to storage class two, a node 1212 representing the move of version four of the data object from storage class two to storage class three, and a node 1214 representing the copy of version seven of the data object back from storage class three back to storage class two.

Also in the example diagram 1200 illustrated in FIG. 12, the storage class three version history 1216 includes a node 1218 representing the move of version five of the data object from storage class two to storage class three.

In an embodiment, the version metadata management service maintains metadata indicating relationships between the additional nodes representing version-changing operations related to other storage classes. For example, the node 1204 representing the move of version zero of the data object from storage class one to storage class two and the node 1210 representing the move of version one of the data object from storage class one to storage class two are associated with the same version-changing operation and thus, the version metadata management service may maintain metadata indicating the relationship between this pair of nodes.

Figure 13:
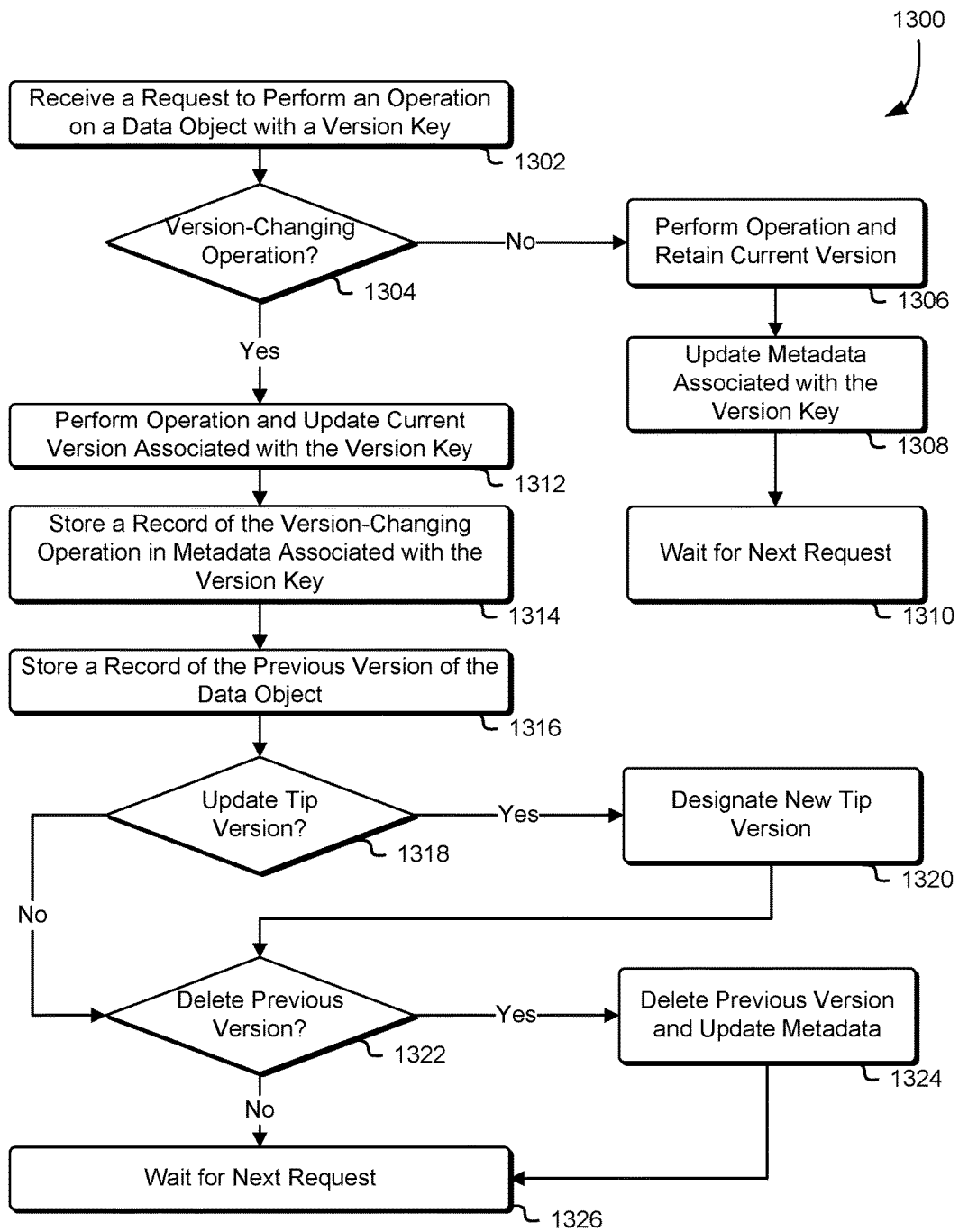
FIG. 13 illustrates an example process for managing multiple versions of data stored in multiple data storage classes and for managing the associated version metadata using a version metadata management service.

FIG. 13 illustrates an example process 1300 for managing multiple versions of data stored in multiple data storage classes and for managing the associated metadata using a version metadata management service as described in connection with FIG. 1 and in accordance with an embodiment. A version metadata management service such as the version metadata management service 124 described in connection with FIG. 1 performs at least a portion of the example process 1300 illustrated in FIG. 13. In the example process 1300 illustrated in FIG. 13, the version metadata management service first receives 1302 a request to perform an operation on a data object with a version key as described above. If the version metadata management service determines 1304 that the operation is not a version-changing operation, the version metadata management service allows the operation to be performed 1306 while retaining the current version of the data object with a version key and, in some embodiments, updates 1308 metadata associated with the version key of the data object before waiting 1310 for the next request.

If the version metadata management service determines 1304 that the operation is a version-changing operation, the version metadata management service allows the operation to be performed 1312 and updates the current version associated with the data object with a version key as described herein. Next the version metadata management service stores 1314 a record of the version-changing operation in metadata associated with the data object with a version key and, in some embodiments, stores 1316 a record of the previous version of the data object (i.e., the version of the data object prior to the version-changing operation) in the metadata associated with the data object.

Next the version metadata management service determines 1318 whether to update one or more tip versions (i.e., designations of the most current version) in the metadata associated with the data object. If the version metadata management service determines 1318 to update one or more tip version in the metadata associated with the data object, the version metadata management service may designate 1320 one or more versions as tip versions in the metadata associated with the data object. Next, the version metadata management service determines 1322 whether to delete one or more previous versions of the data object. If the version metadata management service determines 1322 to delete one or more previous versions of the data object, the version metadata management service causes the data storage services to delete 1324 the one or more previous versions of the data object and updates the metadata associated with those previous versions. The version metadata management service then waits 1326 for the next request.

Figure 14:
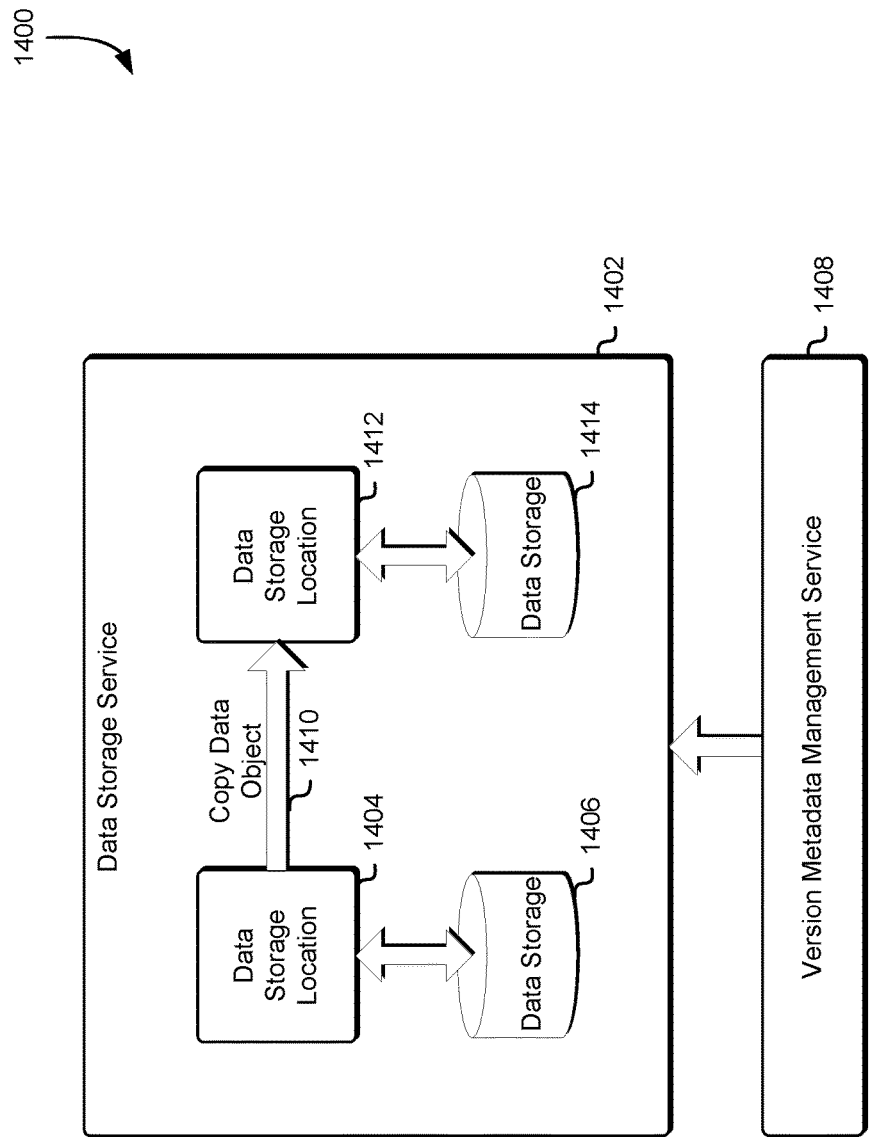
FIG. 14 illustrates an example environment where multiple versions of a data object stored in multiple data storage locations of a data storage service are managed using a version metadata management service.

FIG. 14 illustrates an example environment 1400 where multiple versions of a data object stored in multiple data storage locations of a data storage service are managed using a version metadata management service as described in connection with FIG. 1 and in accordance with an embodiment. In the example environment 1400 illustrated in FIG. 1, a data storage service 1402 (e.g., an on-demand storage service, a block storage service, a file storage service, an archival storage service, a backup storage service, a database storage service, etc.) has multiple data storage locations (e.g., the data storage location 1404 and the data storage location 1412). In an embodiment, the multiple data storage locations are physically separated (also referred to herein as "geographically separated") and are, for example, located in different datacenters in different locations. For example, one datacenter may be located in one country or region and another datacenter may be located in another country or region. In an embodiment, the multiple data storage locations are logically separated and are, for example, located in the same location but logically separated from each other using techniques such as, for example, network partitioning.

In the example environment 1400 illustrated in FIG. 14, the data storage location 1404 and the data storage location 1412 are illustrated as within the data storage service 1402, indicating that, in this example, the data storage location 1404 and the data storage location 1412 include resources (e.g., the data storage 1406 and the data storage 1414) that are managed and/or controlled by the data storage service 1402. Although not shown in the example environment 1400 illustrated in FIG. 14, in an embodiment one or more of the multiple data storage locations are located outside of the data storage service 1402. For example, a data storage location can include resources that are managed and/or controlled by another service that is different from the data storage service 1402 such as, for example, a different data storage service or a different instance of the data storage service 1402. In another example, a data storage location can include resources that are managed and/or controlled by a customer of a computing resource service provider that provides the data storage service as described herein. In another example, a data storage location can include resources that are managed and/or controlled by a third party (i.e., neither the customer nor the computing resource service provider that provides the data storage service). In another example, the data storage service is a service provided by a customer and/or a third party.

In an embodiment, the resources managed and/or controlled by the multiple data storage locations (e.g., the data storage 1406 or the data storage 1414) are physical resources. In an embodiment, the resources managed and/or controlled by the multiple data storage locations (e.g., the data storage 1406 or the data storage 1414) are logical resources (also referred to herein as "virtual resources") backed by physical resources as described herein.

In the example environment 1400 illustrated in FIG. 14, the data storage service 1402 causes an operation to copy a data object 1410 from data storage 1406 at a first data storage location 1404 to data storage 1414 at a second data storage location. As described above, the operation to copy a data object 1410 may be a version-changing operation that changes or updates a version identifier associated with the data object in metadata associated with the data object that is associated with the data object using a version key. Using the techniques described herein, a version metadata management service 1408 may update the version identifier of the data object as a result of the version changing operation.

In an example of an environment where multiple versions of a data object stored in multiple data storage locations of a data storage service are managed using a version metadata management service 1408, a regulatory agency may specify that different versions of a data object (e.g., an active version and a backup version) be stored in physically separated locations that are a minimum distance apart. Compliance with such regulatory agency requirements (also referred to herein as "regulatory compliance") may cause one or more data policies to be generated as a result. Examples of types of regulatory compliance include, but are not limited to, compliance with the Health Insurance Portability and Accountability Act of 1996 ("HIPAA"), compliance with the International Traffic in Arms Regulations ("ITAR"), compliance with the European Union General Data Protection Regulation ("GDPR"), or other such regulations. In an example of an environment where multiple versions of a data object stored in multiple data storage locations of a data storage service are managed using a version metadata management service 1408, a customer of a data storage service may specify that different versions of a data object be stored in logically separated locations that are isolated from one another.

As described above, the different data storage locations such as the data storage location 1404 or the data storage location 1412 may be data storage provided by different data storage classes such as those described above. For example, the on-demand storage service 112, the archival storage service 116, and the backup storage service 120 are each different data storage classes and thus, may be different data storage locations. The different data storage classes may also be different types of data storage within a particular data storage service. For example, "current" on-demand storage and "archival" on-demand storage are each different data storage classes. The different data storage classes may also be different data storage locations within a particular data storage service. For example, archival storage in a first data storage location (e.g., at a first geographical location) and archival storage in a second data storage location (e.g., at a second geographical location geographically separated from the first geographical location) are each different data storage classes. As described above, different data storage classes may have different data storage services, different data storage types within a data storage service, different data storage locations within a data storage service, or combinations of these and/or other different data storage attributes.

Figure 15:
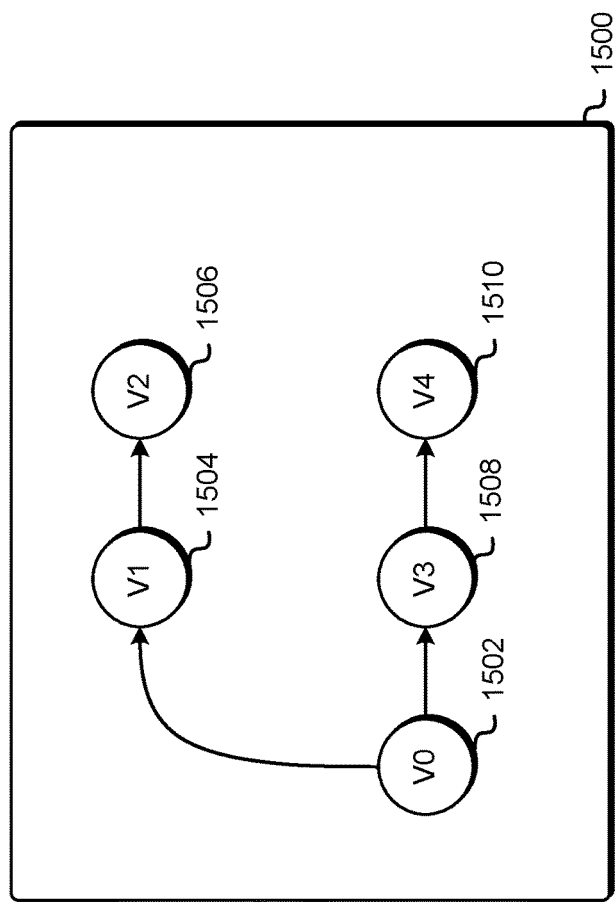
FIG. 15 illustrates an example representation of a version history where multiple versions of a data object stored in multiple data storage locations of a data storage service are managed using a version metadata management service.

FIG. 15 illustrates an example representation 1500 of a version history where multiple versions of a data object stored in multiple data storage locations of a data storage service are managed using a version metadata management service as described in connection with FIG. 1 and in accordance with an embodiment. The example representation 1500 of the version history of multiple versions of a data object stored in multiple data storage locations of a data storage service that is managed using a version metadata management service illustrated in FIG. 15 is a DAG as described above.

The example representation 1500 of the version history of multiple versions of a data object stored in multiple data storage locations of a data storage service that is managed using a version metadata management service illustrated in FIG. 15 corresponds to the example environment 1400 illustrated in connection with FIG. 14. In the example representation 1500 illustrated in FIG. 15, node 1502 (e.g., version zero of the data object "V0") represents the version of the data object stored in the first data storage 1406 in the first data storage location 1404 of the data storage service 1402 before the operation to copy the data object 1410, and node 1504 (e.g., version zero of the data object "V0") represents the version of the data object stored in the second data storage 1414 in the second data storage location 1412 of the data storage service 1402 after the operation to copy the data object 1410.

The example representation 1500 of the version history of multiple versions of a data object stored in multiple data storage locations of a data storage service that is managed using a version metadata management service illustrated in FIG. 15 includes additional nodes that represent additional versions of the data object not illustrated in the example environment 1400 illustrated in connection with FIG. 14. For example, node 1506 (e.g., version two of the data object "V2") represents a subsequent update to node 1504 in the second data storage location, node 1508 (e.g., version three of the data object "V3") represents a subsequent update to node 1502 in the first data storage location, and node 1510 (e.g., version four of the data object "V4") represents a subsequent update to node 1508 in the first data storage location.

Figure 16:
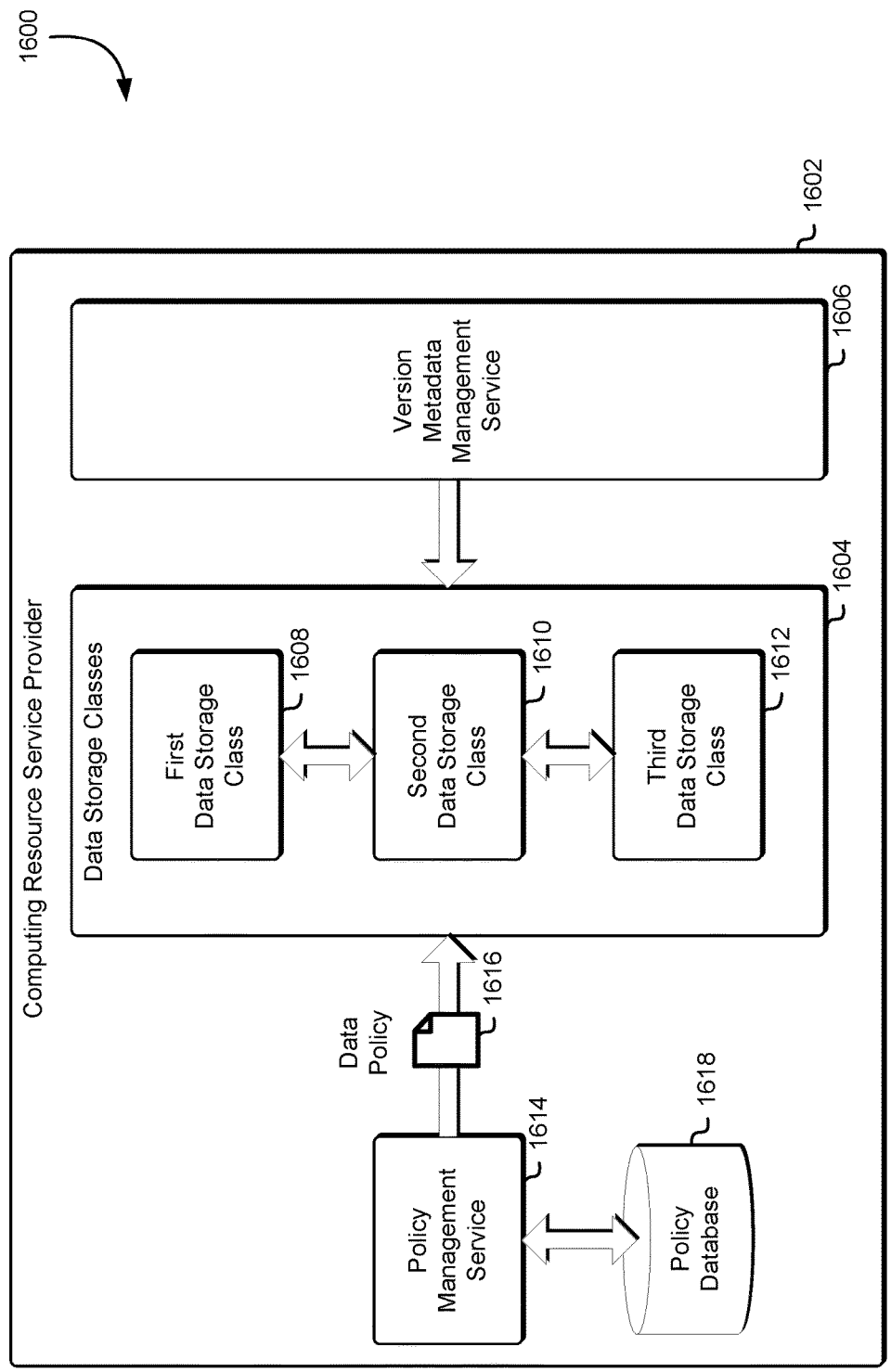
FIG. 16 illustrates an example environment where policy-based versioning of a data object is managed using a version metadata management service.

FIG. 16 illustrates an example environment 1600 where policy-based versioning of a data object is managed using a version metadata management service as described in connection with FIG. 1 and in accordance with an embodiment. In the example environment 1600 illustrated in FIG. 16, a version metadata management service 1606 of a computing resource service provider 1602 manages version metadata for one or more data storages classes 1604 (e.g., a first data storage class 1608, a second data storage class 1610, and a third data storage class 1612) as described herein. Version-changing operations such as, for example, move operations, copy operations, update operations, or delete operations, that are performed on a data object may cause changes to the version identifier of the data object also as described herein.

In the example environment 1600 illustrated in FIG. 16, a policy management service 1614 provides a data policy 1616 from a policy database 1618 for the management of data objects stored in the one or more data storage classes 1604. The data policy 1616 may specify operations that are performed on the data objects during the lifecycle of the data objects, and one or more of those operations may be version-changing operations. In an embodiment, the data policy is associated with the data object in the policy database using the version key as an identifier, as described above so that, for example, the data policy can be associated with the data object in multiple data storage classes.

A policy management service 1614 is a service provided by a computing resource service provider 1602 that allows a customer of the computing resource service provider 1602 to set, manage, edit, update, and delete policies related to resources of the computing resource service provider 1602. For example, an administrator of a user account of a customer of a computing resource service provider 1602 may access a policy management service 1614 to establish one or more computing resource policies that are be applicable to requests from users to access computing resources provided by the computing resource service provider 1602 using the user account. The computing resource policies may specify various dependency conditions between the computing resources specified in the policy and other computing resources specified in the one or more elements of the policy. In response to a request from a user to access a particular computing resource, the computing resource service provider 1602 may obtain the computing resource policy, along with any other applicable computing resource policies and, based at least in part on the specified dependencies of the policy, determine whether the user is authorized to access the computing resource specified in the user's request.

An administrator or privileged user of a customer account (e.g., policy owner) may also access a policy management service 1614 provided by a computing resource service provider 1602 to create new computing resource policies that may be stored in the policy database 1618. In an example, the policy management service 1614 may include an interface, such as a GUI or a web interface, which may be used to specify the one or more parameters of a computing resource policy. In another example, the policy owner may transmit one or more API calls to the policy management service 1614 to request creation of the computing resource policy. The request may further specify one or more users, groups, roles, and computing resources that are to be associated with the computing resource policy once the policy has been created. The administrator may also define any dependency conditions between the computing resource specified in the computing resource policy and other computing resources specified in the computing resource policy. These dependency conditions may be stored by the policy management service 1614 in the form of a mapping of dependencies that may be provided to services of the computing resource service provider such as, for example, data storage services of the data storage classes 1604.

The policy management service 1614 may generate the computing resource policy and store the computing resource policy in a policy database 1618. The policy database 1618 may be a database that may be used to store the computing resource policies. The policy database 1618 may also be used to store metadata about the computing resource policy (e.g., name of the computing resource policy, a policy owner identifier, when the computing resource policy was generated, dependency conditions specified in the computing resource policy, etc.). In response to a new computing resource policy being created, the policy management service 1614 may update this database table to include the newly generated computing resource policy. The policy database 1618 may further store other computing resource policies applicable to users, roles, groups, and computing resources provided by the computing resource service provider 1602 through one or more services of the computing resource service provider 1602. These other computing resource policies may specify dependency conditions among computing resources through conditional statements. The policy database 1618 may include additional database tables corresponding to the various users and accounts associated with the computing resource service provider 1602. This table may specify user and account metadata, such as identifiers for the users and accounts, contact information, associated resources, and the like.

The data policy 1616 may be a policy related to a customer (i.e., that all data objects for all users associated with a customer are managed a specified way), a user account (i.e., that all data objects for the user account are managed in a specified way), a data storage class (i.e., that all data objects stored in a particular storage class are managed in a specified way), a data object (i.e., that a data object is managed in a specified way), or to some other aspect of the data. In an embodiment, multiple policies are applicable to a particular data object when, for example, there is a customer policy, a user account policy, a data storage class policy, and/or a data object policy. A policy management service 1614 performs operations to resolve any conflicts between these policies and to perform the correct operation on a data object based on the policies. The data policy 1616 may be specified by the customer as described herein. In an embodiment, the data policy 1616 is based on one or more policy templates provided by the computing resource service provider that are usable by the customer to generate data policies.

As an example of a data policy that is related to a data object, a data policy 1616 may specify that any updates that are made to a data object stored in data storage of first data storage class 1608 cause a copy of the updated data object (i.e., the data object before or after the update) to be stored in data storage of the second data storage class 1610. Thus, according to this data policy, after ten updates to the data object, the most recent version of the data object is stored in data storage of the first data storage class 1608 and ten versions of the data object are stored in data storage of the second data storage class 1610, with the newest version of the data object that is stored in data storage of the second data storage class 1610 being a copy of either the most recent version of the data object stored in data storage of the first data storage class 1608 if, for example, the copy is made after the update or a copy of the previous most recent version of the data object stored in data storage of the first data storage class 1608 if, for example, the copy is made before the update.

The data policy 1616 may further specify that no more than three versions of the data object will be stored in data storage of the second data storage class 1610 and that, when a fourth version of the data object is stored in data storage of the second data storage class 1610, the oldest (i.e., the first one stored) will be moved to data storage of the third data storage class 1612. Thus, according to this data policy, after ten updates to the data object, the most recent version of the data object is still stored in data storage of the first data storage class 1608, three versions of the data object are stored in data storage of the second data storage class 1610 (again with the newest version of the data object that is stored in data storage of the second data storage class 1610 being a copy of the most recent version of the data object stored in data storage of the first data storage class 1608), and the seven older versions of the data object are stored in data storage of the third data storage class 1612.

The data policy 1616 may further specify that no more than two versions of the data object will be stored in data storage of the third data storage class 1612 and that, when a third version of the data object is stored in data storage of the third data storage class 1612, the oldest (i.e., the first one stored) will be deleted. Thus according to this data policy, after ten updates to the data object, the most recent version of the data object is still stored in data storage of the first data storage class 1608, three versions of the data object are stored in data storage of the second data storage class 1610 (again with the newest version of the data object that is stored in data storage of the second data storage class 1610 being a copy of the most recent version of the data object stored in data storage of the first data storage class 1608), and only two of the older versions of the data object are stored in data storage of the third data storage class 1612.

A data policy 1616 may be based on regulatory issues such as those described above. A data policy 1616 may also be based on a desire to maintain many backups of a data object but to reduce the cost of such backups so that, for example, older backups are stored on slower, less accessible, and/or less expensive media using an archival storage service as described above. Such slower, less accessible, and/or less expensive media has a lower resource cost than faster, more accessible, and/or more expensive media.

Figure 17:
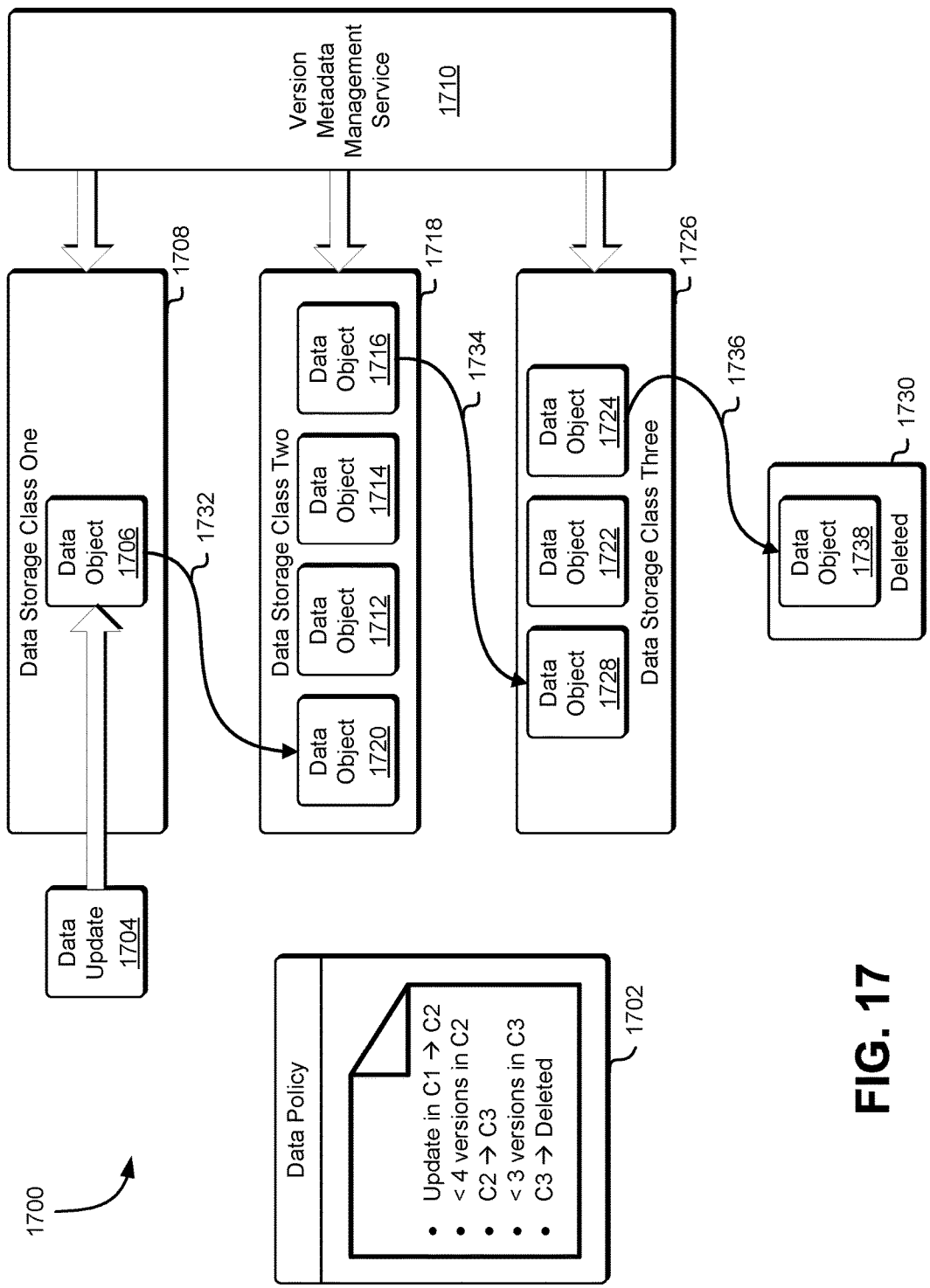
FIG. 17 illustrates an example environment where multiple versions of a data object updated using policy-based updates are managed using a version metadata management service.

FIG. 17 illustrates an example environment 1700 where multiple versions of a data object updated using policy-based updates are managed using a version metadata management service as described in connection with FIG. 1 and in accordance with an embodiment. In the example environment 1700 illustrated in FIG. 17, a data policy 1702 specifies that any updates that are made to a data object stored in data storage of data storage class one 1708 cause a copy of the updated data object (i.e., the data object before the update, in this example) to be stored in data storage of data storage class two 1718, that less than four versions of the data object are stored in data storage of data storage class two 1718, that older versions of the data object are moved from data storage of data storage class two 1718 to data storage of data storage class three 1726, that less than three versions of the data object are stored in data storage of data storage class three 1726, and that older versions of data in data storage of data storage class three 1726 are deleted 1730.

When a data update 1704 to the data object 1706 in data storage class one 1708 is received, the data object 1706 is updated, the version identifier of the data object 1706 is updated by a version metadata management service 1710 as a result of the version-changing operation (e.g., the data update 1704).

Applying the first part of the data policy 1702 (e.g., that any updates that are made to a data object stored in data storage of data storage class one 1708 cause a copy of the updated data object to be stored in data storage of data storage class two 1718), causes the updated data object 1706 to be copied 1732 from data storage class one 1708 to data storage class two 1718, creating data object 1720 in data storage class two 1718. In the example environment 1700 illustrated in FIG. 17, data object 1720 is a copy of data object 1706 before the update. As described above, when a data object such as data object 1706 is copied 1732 to data storage of a different data storage class, the version identifier of the data object 1706 may be updated by a version metadata management service 1710 as a result of the version-changing operation (e.g., when the data is copied 1732).

In the example environment 1700 illustrated in FIG. 17, there are already three versions of the data object stored in data storage of data storage class two 1718 (e.g., data object 1712, data object 1714, and data object 1716) and creating data object 1720 in data storage class two 1718 is contrary to the second part of the data policy 1702 (e.g., that less than four versions of the data object are stored in data storage of data storage class two 1718).

Applying the third part of the data policy 1702 (e.g., that older versions of the data object are moved from data storage of data storage class two 1718 to data storage of data storage class three 1726), the oldest version of the data object (e.g., data object 1716) is moved 1734 from data storage class two 1718 to data storage of data storage class three 1726, creating data object 1728 in data storage class three 1726. In the example environment 1700 illustrated in FIG. 17, data object 1728 is the same as data object 1716. In an embodiment, the data object 1716 is moved from data storage class two 1718 to become data object 1728 in data storage class three 1726. In an embodiment, the data object 1716 is copied from data storage class two 1718 to the data object 1728 in data storage class three 1726 and, after the copy, the data object 1716 is deleted from data storage class two 1718. As described above, when a data object such as data object 1716 is moved 1734 to data storage of a different data storage class, the version identifier of the data object 1716 may be updated by a version metadata management service 1710 as a result of the version-changing operation (e.g., when the data is moved 1734).

In the example environment 1700 illustrated in FIG. 17, there are already two versions of the data object stored in data storage of data storage class three 1726 (e.g., data object 1722 and data object 1724) and moving the data object 1716 in data storage class two 1718 to data object 1728 in data storage class three 1726 is contrary to the fourth part of the data policy 1702 (e.g., that less than three versions of the data object are stored in data storage of data storage class three 1726).

Applying the fifth part of the data policy 1702 (e.g., that older versions of data in data storage of data storage class three 1726 are deleted 1730), the oldest version of the data object in data storage class three 1726 (e.g., data object 1724) is deleted 1736 from data storage class three. As described above, when a data object such as data object 1724 is deleted 1736, the version identifier of the data object 1724 may be updated by a version metadata management service 1710 as a result of the version-changing operation (e.g., when the data is deleted 1736). In the example environment 1700 illustrated in FIG. 17, that data object 1738 that is deleted 1730 has the data associated with the data object 1738 deleted but the metadata associated with the data object 1738 is not deleted, making data object 1738 a "tombstone" object with metadata but no data as described above.

Figure 18:
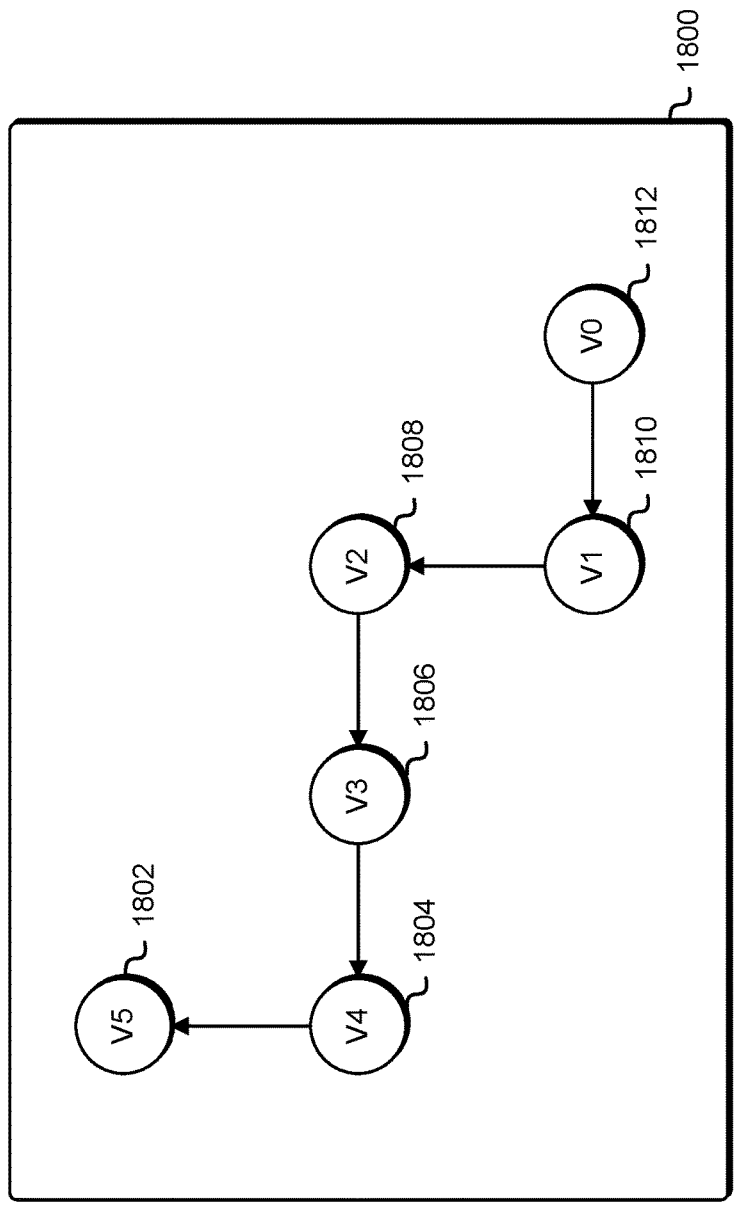
FIG. 18 illustrates an example representation of a version history of multiple versions of a data object before the data object is updated using policy-based updates that is managed using a version metadata management service.

FIG. 18 illustrates an example representation 1800 of a version history of multiple versions of a data object before the data object is updated using policy-based updates that is managed using a version metadata management service as described in connection with FIG. 1 and in accordance with an embodiment. The example representation 1800 of the version history of multiple versions of a data object before the data object is updated using policy-based updates that is managed using a version metadata management service illustrated in FIG. 18 is a DAG as described above.

The example representation 1800 of the version history of multiple versions of a data object before the data object is updated using policy-based updates that is managed using a version metadata management service illustrated in FIG. 18 corresponds to the example environment 1700 illustrated in connection with FIG. 17 before the data update 1704 is applied. In the example representation 1800 illustrated in FIG. 18, node 1802 (e.g., version five of the data object "V5") represents the active version of the data object (e.g., data object 1706) in data storage class one 1708, node 1804 (e.g., version four of the data object "V4") represents the newest copy of the active version of the data object (e.g., data object 1712) in data storage class two 1718, node 1806 (e.g., version three of the data object "V3") represents the next newest copy of the active version of the data object (e.g., data object 1714) in data storage class two 1718, node 1808 (e.g., version two of the data object "V2") represents the oldest copy of the active version of the data object (e.g., data object 1716) in data storage class two 1718, node 1810 (e.g., version one of the data object "V1") represents the newest copy of the data object (e.g., data object 1722) in data storage class three 1726, and node 1812 (e.g., version zero of the data object "V0") represents the oldest copy of the data object (e.g., data object 1724) in data storage class three 1726.

Figure 19:
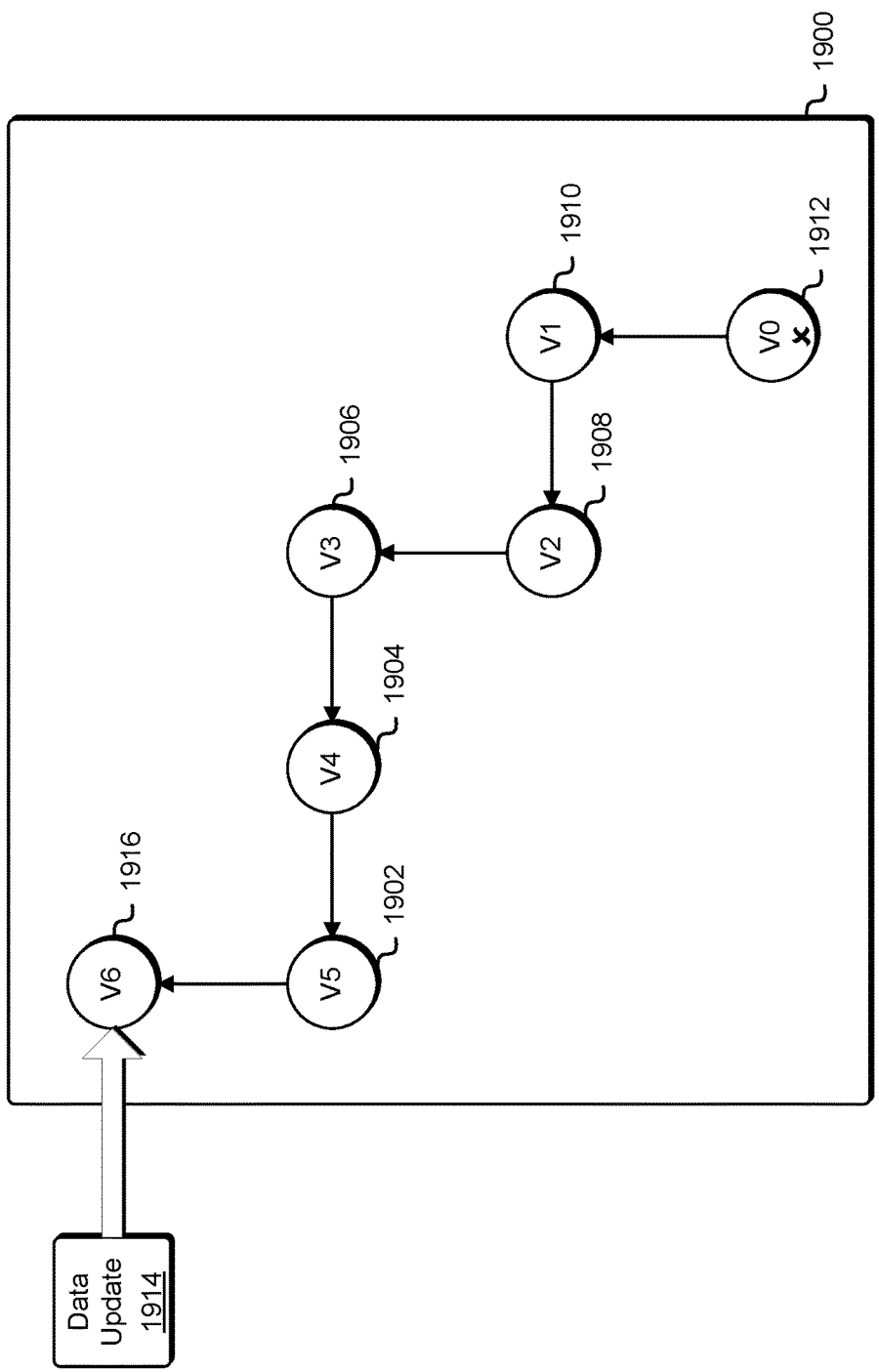
FIG. 19 illustrates an example representation of a version history of multiple versions of a data object after the data object is updated using policy-based updates that is managed using a version metadata management service.

FIG. 19 illustrates an example representation 1900 of a version history of multiple versions of a data object after the data object is updated using policy-based updates that is managed using a version metadata management service as described in connection with FIG. 1 and in accordance with an embodiment. The example representation 1900 of the version history of multiple versions of a data object after the data object is updated using policy-based updates that is managed using a version metadata management service illustrated in FIG. 19 is a DAG as described above.

The example representation 1900 of the version history of multiple versions of a data object after the data object is updated using policy-based updates that is managed using a version metadata management service illustrated in FIG. 19 corresponds to the example environment 1700 illustrated in connection with FIG. 17 after the data update 1704 is applied. In the example representation 1900 illustrated in FIG. 19, node 1916 (e.g., version six of the data object "V6") represents the active version of the data object after the data update 1914, node 1902 (e.g., version five of the data object "V5") represents the copy of the active version of the data object (e.g., data object 1720) in data storage class two 1718, node 1904 (e.g., version four of the data object "V4") represents the previous newest copy of the active version of the data object (e.g., data object 1712) in data storage class two 1718, node 1906 (e.g., version three of the data object "V3") represents the oldest copy of the active version of the data object (e.g., data object 1714) in data storage class two 1718, node 1908 (e.g., version two of the data object "V2") represents the newest copy of the data object (e.g., data object 1728) in data storage class three 1726, node 1910 (e.g., version one of the data object "V1") represents the oldest copy of the data object (e.g., data object 1722) in data storage class three 1726, and node 1912 (e.g., version zero of the data object "V0") represents the deleted copy of the data object (e.g., data object 1738).

Figure 20:
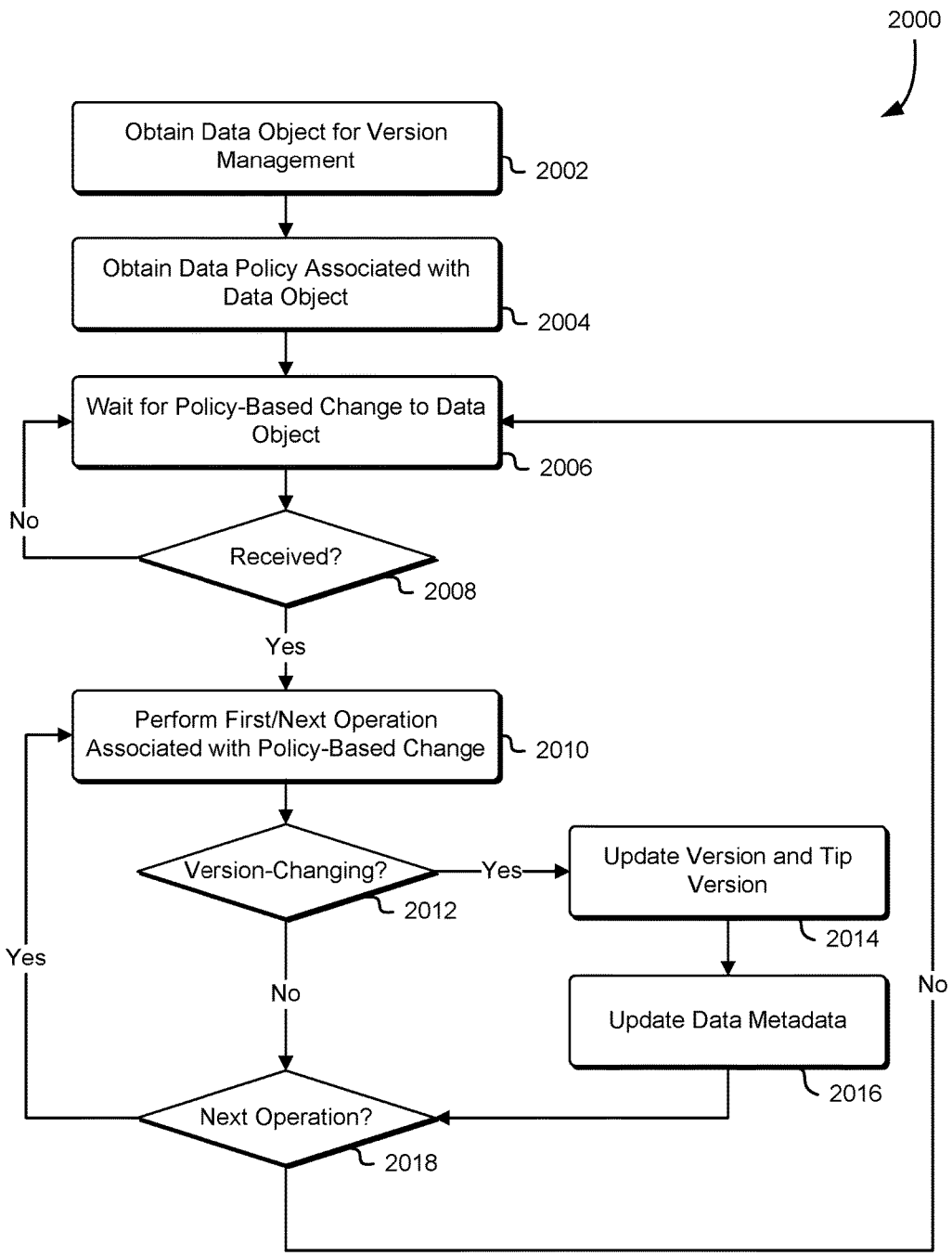
FIG. 20 illustrates an example process 2000 for managing policy-based versioning of a data object using a version metadata management service.

FIG. 20 illustrates an example process 2000 for managing policy-based versioning of a data object using a version metadata management service as described in connection with FIG. 1 and in accordance with an embodiment. A version metadata management service such as the version metadata management service 124 described in connection with FIG. 1 performs the example process 2000 illustrated in FIG. 20.

A version metadata management service first obtains 2002 a data object for version management as described above and also obtains 2004 a policy associated with the data object. The version metadata management service next waits 2006 for policy-based changes to the data object. A policy-based change to the data object is a change to the data object that causes one or more operations on the data object (e.g., a move, copy, delete, update, etc.) to be performed, and that is generated as a result of applying the policy associated with the data object to the data object. For example, a data policy for a data object may specify that any updates that are made to a data object stored in data storage of data storage class one cause a copy of the data object to be stored in data storage of data storage class two, that less than four versions of the data object are stored in data storage of data storage class two, that older versions of the data object are moved from data storage of data storage class two to data storage of data class three, that less than three versions of the data object are stored in data storage of data class three, and that older versions of data in data storage of data class three are deleted as described above. A policy-based change to the data object may include the data update, the copy of the data object from data storage of data storage class one to data storage of data storage class two as a result of the update, the move of the oldest version of the data object from data storage of data storage class two to data storage of data storage class three as a result of the copy, and the delete of the oldest version of the data object from data storage of data storage class three as a result of the move.

When a policy-based change to the data object is received 2008, causing the version metadata management service to perform 2010 first/next operation of the policy-based change, the version metadata management service next determines 2012 whether the operation of the policy-based change is a version-changing operation as described above. If the version metadata management service determines 2012 that the operation of the policy-based change is a version-changing operation, the version metadata management service updates 2014 the version identifier of the data object and, in some embodiments, updates the tip version of the data object, both as described above. The version metadata management service then updates 2016 the data object metadata as a result of the version-changing operation also as described above. Finally, the version metadata management service determines 2018 whether there are more operations to perform as a result of the policy-based change to the data object. If the version metadata management service determines 2012 that the operation of the policy-based change is not a version-changing operation, the version metadata management service also determines 2018 whether there are more operations to perform as a result of the policy-based change to the data object. Finally, if the version metadata management service determines 2018 that there are no more operations to perform as a result of the policy-based change to the data object, the version metadata management service waits 2006 for the next policy-based changes to the data object.

Figure 21:
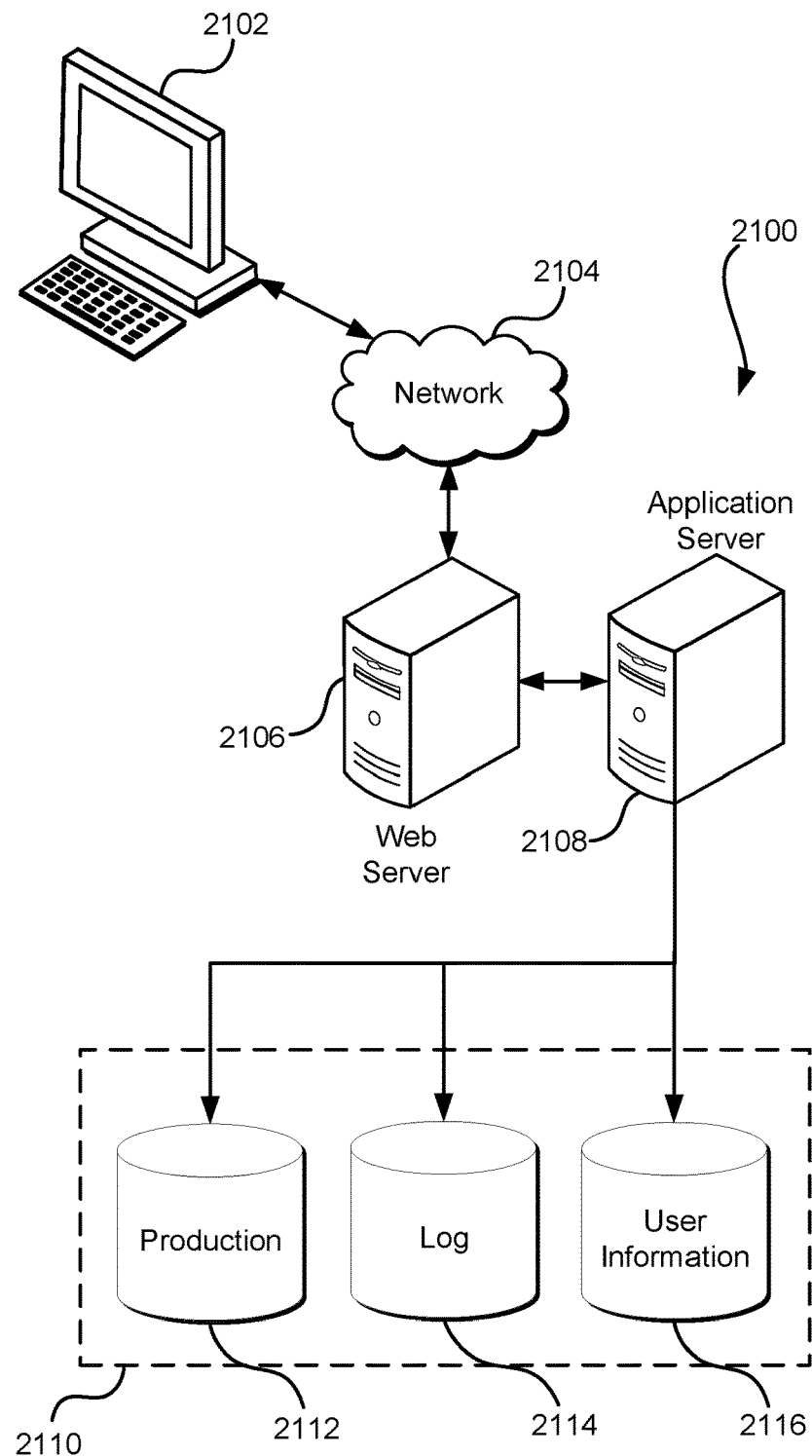
FIG. 21 illustrates an environment in which various embodiments can be implemented.

FIG. 21 illustrates aspects of an example environment 2100 for implementing aspects in accordance with various embodiments. As will be appreciated, although a web-based environment is used for purposes of explanation, different environments may be used, as appropriate, to implement various embodiments. The environment includes an electronic client device 2102, which can include any appropriate device operable to send and/or receive requests, messages, or information over an appropriate network 2104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 2106 for receiving requests and serving content in response thereto, although for other networks an alternative device serving a similar purpose could be used as would be apparent to one of ordinary skill in the art.

The illustrative environment includes at least one application server 2108 and a data store 2110. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage systems, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 2102 and the application server 2108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 2110 can include several separate data tables, databases, data documents, dynamic data storage schemes, and/or other data storage mechanisms and media for storing data relating to a particular aspect of the present disclosure. For example, the data store illustrated may include mechanisms for storing production data 2112 and user information 2116, which can be used to serve content for the production side. The data store also is shown to include a mechanism for storing log data 2114, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 2110. The data store 2110 is operable, through logic associated therewith, to receive instructions from the application server 2108 and obtain, update or otherwise process data in response thereto. The application server 2108 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 2102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 21. Thus, the depiction of the system 2100 in FIG. 21 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage, and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   assigning a version key to a data object stored using a first data storage class, the version key being an identifier that identifies a version of the data object in a plurality of data storage classes; and
   as a result of performing a version-changing operation on the data object, the version-changing operation including at least one of: updating the data object, moving the data object from the first data storage class to a second data storage class, copying the data object from the first data storage class to the second data storage class, or deleting the data object, at least:
      updating a version identifier of the data object;
      updating version metadata associated with the data object, the version metadata stored as a directed acyclic graph and associated with the data object and the version key, the version metadata at least including a history of version-changing operations performed on the data object;
      determining, based at least in part on the first data storage class, a subset of the version metadata; and
      providing the subset of the version metadata to a data storage service of the first data storage class, the subset associated with the data object based at least in part on the version key.

2. The computer-implemented method of claim 1, further comprising:
   as a result of the version-changing operation causing the data object to be stored using a second data storage class:
      determining, based at least in part on the second data storage class, a second subset of the version metadata; and
      providing the second subset of the version metadata to a second data storage service of the second data storage class, the second subset associated with the data object based at least in part on the version key.

3. The computer-implemented method of claim 1, wherein updating the version identifier of the data object comprises:
   determining a first version identifier of the data object before the version-changing operation is performed;
   producing a second version identifier based at least in part on the first version identifier; and
   assigning the second version identifier to the data object after the version-changing operation is performed.

4. The computer-implemented method of claim 1, wherein the version metadata includes a reference from the data object after the version-changing operation is performed to the data object before the version-changing operation is performed.

5. A system, comprising, at least one computing device configured with processors and memory, the memory including instructions that, when executed, cause the system to:
   update a version identifier of a data object stored in data storage based at least in part on a version-changing operation of a plurality of version-changing operations performed on the data object, the plurality of version changing operations including one or more operations that change a data storage class of the data object; and
   update metadata associated with the data object based at least in part on the version-changing operation, the metadata stored as a directed acyclic graph and associated with the data object based at least in part on a version key of the data object, the version key being an identifier that identifies a version of the data object in a plurality of data storage classes, the metadata at least including a history of version-changing operations performed on the data object.

6. The system of claim 5, wherein the data storage is provided by an on-demand storage service and the data object is stored in on-demand storage.

7. The system of claim 5, wherein the data storage is provided by an archival storage service and the data object is stored in archival storage.

8. The system of claim 5, wherein the data storage is provided by a backup storage service and the data object is stored in backup storage.

9. The system of claim 5, wherein the metadata includes the version identifier of the data object after the update.

10. The system of claim 5, wherein the metadata includes an indication of a current version identifier of the data object based at least in part on the version-changing operation.

11. The system of claim 5, wherein the metadata includes a version history of the data object provided by a customer associated with the data object.

12. The system of claim 5, wherein:
    the metadata includes a first checksum of the data object before the version-changing operation;
    the metadata includes a second checksum of the data object after the version-changing operation; and
    the first checksum and the second checksum are usable to validate the version-changing operation.

13. A non-transitory computer-readable storage medium storing thereon instructions that, as a result of being executed by one or more processors of a computer system, cause the computer system to at least:
    detect one or more version-changing operations on a data object stored in data storage using a data storage class;
    update a version identifier of the data object based at least in part on the one or more version-changing operations, the one or more version-changing operations including at least one version-changing operation that changes the data storage class of the data;
    update metadata associated with the data object, the metadata stored as a directed acyclic graph and associated with the data object based at least in part on a version key of the data object, the version key being an identifier that identifies a version of the data object in a plurality of data storage classes, the metadata at least including a history of version-changing operations performed on the data object; and
    provide the metadata.

14. The non-transitory computer-readable storage medium of claim 13, wherein the instructions further comprise instructions that, as a result of being executed by the one or more processors, cause the computer system to:

determine, based at least in part on the data storage class, a subset of the metadata; and provide the subset of the metadata to a data storage service of the data storage class.

15. The non-transitory computer-readable storage medium of claim 13, wherein the instructions further comprise instructions that, as a result of being executed by the one or more processors, cause the computer system to store a subset of the metadata with the data object, the subset of the metadata based at least in part on the version-changing operation.

16. The non-transitory computer-readable storage medium of claim 13, wherein the instructions that cause the computer system to update the version identifier of the data object further include instructions that, as a result of being executed by the one or more processors, cause the computer system to:

store the version identifier in the metadata before update of the version identifier of the data object; and store the version identifier in the metadata after the update of the version identifier of the data object.

17. The non-transitory computer-readable storage medium of claim 13, wherein the one or more version-changing operations include at least one version-changing operation that changes a storage location of the data object from a first data storage location to a second data storage location different than the first data storage location.

18. The non-transitory computer-readable storage medium of claim 13, wherein the data storage is provided by a data storage service that includes at least one of: an on-demand storage service, an archival storage service, a backup storage service, a file storage service, a block storage service, an on-premises storage service, or a database service.

19. The non-transitory computer-readable storage medium of claim 13, wherein the directed acyclic graph includes a set of nodes with the metadata and a set of edges directionally connecting pairs of nodes of the set of nodes with the metadata.

20. The non-transitory computer-readable storage medium of claim 19, wherein the instructions that cause the computer system to provide the metadata further include instructions that, as a result of being executed by the one or more processors, cause the computer system provide, using a web interface, the directed acyclic graph to a customer associated with the data object.

* * * * *